(12) United States Patent
Russell

(10) Patent No.: US 10,188,047 B2
(45) Date of Patent: Jan. 29, 2019

(54) PLANT LABELING SYSTEM AND GARDEN TOOLS

(71) Applicant: Dina Russell, Seattle, WA (US)

(72) Inventor: Dina Russell, Seattle, WA (US)

( * ) Notice: Subject to any disclaimer, the term of this patent is extended or adjusted under 35 U.S.C. 154(b) by 0 days.

(21) Appl. No.: 15/912,499

(22) Filed: Mar. 5, 2018

(65) Prior Publication Data

US 2018/0325037 A1 Nov. 15, 2018

Related U.S. Application Data

(63) Continuation of application No. 15/156,303, filed on May 16, 2016.

(60) Provisional application No. 62/162,578, filed on May 15, 2015.

(51) Int. Cl.
| | | |
|---|---|---|
| *A01G 9/00* | (2018.01) | |
| *G09F 3/20* | (2006.01) | |
| *G09F 3/14* | (2006.01) | |
| *G09F 3/08* | (2006.01) | |

(52) U.S. Cl.
CPC ............ *A01G 9/006* (2013.01); *G09F 3/08* (2013.01); *G09F 3/14* (2013.01); *G09F 3/206* (2013.01)

(58) Field of Classification Search
CPC ........ A01G 9/023; A01G 9/024; A47G 7/041; A47G 7/044; A47G 7/047
See application file for complete search history.

(56) References Cited

U.S. PATENT DOCUMENTS

| | | | |
|---|---|---|---|
| 4,079,530 A | 3/1978 | Atherton et al. | |
| 5,438,796 A | 8/1995 | Nathan | |
| 5,598,662 A * | 2/1997 | Droste | A47G 7/041 47/39 |
| 5,934,651 A | 8/1999 | Koljonen | |
| 6,327,804 B1 | 12/2001 | Shaw | |
| 7,275,341 B1 | 10/2007 | Kincaid | |
| 7,913,452 B1 * | 3/2011 | Imm | A01G 9/124 47/39 |
| 2002/0061366 A1 | 5/2002 | Walker et al. | |
| 2005/0082244 A1 * | 4/2005 | Ho | A47G 7/041 211/85.23 |

(Continued)

*Primary Examiner* — Gary C Hoge
(74) *Attorney, Agent, or Firm* — Lowe Graham Jones PLLC

(57) ABSTRACT

A plant labeling system includes an adjustable, malleable support made of weather-resistant material, a tag made of weather-resistant material removably secured to the support and a label removable affixed to the tag corresponding to a predetermined type of plant. The system may also include an electronic identification beacon removably attached to at least one of the support, tag or label. A method for manufacturing a plant labeling system includes preparing a malleable support made of weather-resistant material having one end configured to stake into the ground; mixing malleable material that becomes weather resistant when cured; rolling out the malleable material onto sheets having a support matrix; cutting malleable material to predetermined size and shape for plant tag; integrating the malleable material with the support; shaping resulting integrated material and support into predetermined size and shape; and curing the integrated material and support into the finished labeling system.

7 Claims, 60 Drawing Sheets

(56) References Cited

U.S. PATENT DOCUMENTS

| | | | |
|---|---|---|---|
| 2006/0124817 A1* | 6/2006 | White | A47G 7/044 |
| | | | 248/339 |
| 2009/0229177 A1 | 9/2009 | Hyde et al. | |
| 2011/0146124 A1 | 6/2011 | Carlson et al. | |
| 2012/0240458 A1* | 9/2012 | Ganske | A47G 7/041 |
| | | | 47/39 |
| 2013/0145690 A1* | 6/2013 | Cannon | A01G 9/023 |
| | | | 47/66.7 |
| 2014/0353439 A1* | 12/2014 | Schilling | A47G 7/041 |
| | | | 248/125.1 |
| 2017/0130893 A1* | 5/2017 | Wichman | F16B 2/22 |

\* cited by examiner

PLANT LABELING SYSTEM AND GARDEN TOOLS

PRIORITY CLAIM

This application is a continuation of U.S. patent application Ser. No. 15/156,303 filed on May 16, 2016, which claims the benefit of U.S. Provisional Patent Application No. 62/162,578 filed on May 15, 2015, the subject matter of which applications is incorporated herein by reference in its entirety.

FIELD OF THE INVENTION

The invention related generally to systems, devices and methods for an eco-friendly, durable and ergonomically balanced plant labeling system and garden tools that facilitate the long-term health of the people who use them.

SUMMARY OF THE INVENTION

One embodiment of the present invention is directed to a plant labeling system that includes a malleable support made of weather-resistant material having one end configured to stake into the ground, wherein the size and orientation of the support is adjustable, a tag made of weather-resistant material removably secured to the support and a label removable affixed to the tag corresponding to a predetermined type of plant. The system may also include an electronic identification beacon removable attached to at least one of the support, tag or label. The support may be made from weather-treated wood. The tag may be stamped and embossed with the predetermined type of plant. In certain embodiments, the system may include a plurality of supports, tags and labels.

A method for manufacturing a plant labeling system is also disclosed. The steps include preparing a malleable support made of weather-resistant material having one end configured to stake into the ground; mixing malleable material that becomes weather resistant when cured; rolling out the malleable material onto sheets having a support matrix; cutting malleable material to predetermined size and shape for plant tag; integrating the malleable material with the support; shaping resulting integrated material and support into predetermined size and shape; and curing the integrated material and support into the finished labeling system. The malleable support may be sanitized using at least one of heat or cold to kill insects or other organisms from the support. The step of preparing a malleable support may involve using coating the support with a weather-resistant material. The method may include additional steps of rolling out additional malleable material into separate sheets having a support matrix; and combining the malleable material and additional malleable material prior to cutting the malleable material to predetermined size and shape for plant tag. The step of integrating the malleable material with the support comprises sewing the support matrix with stability material as needed to stabilize the predetermined size and shape for the plant tag.

BRIEF DESCRIPTION OF THE DRAWINGS

Preferred and alternative examples of the present invention are described in detail below with reference to the following drawings.

The Art of Staking

DETAILED DESCRIPTION OF THE PREFERRED EMBODIMENT

The Art of Staking

Figure 1:
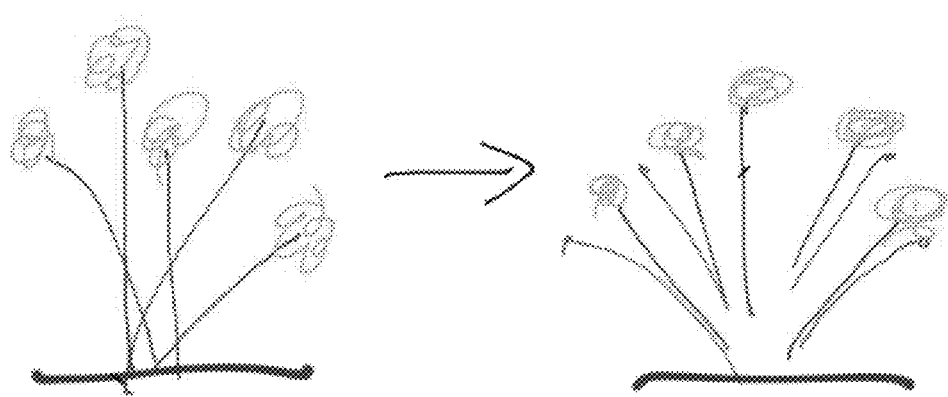
FIG. 1 is a side view of a FlexiStake of embodiments of the present invention.

FIG. 1 shows a FlexiStake, preferably constructed of modular, flexible metal wire traditionally used for bonsai coated with colored tubing (green, brown, camouflage, etc.) to allow the gardener to adapt and shape the stake to fit the plant. They are preferably bendable to adapt to particular applications. Can be mix and matched with GroundPosts, SLeaves, Made of Finials, Caddies and FlexiBases.

Figure 2:
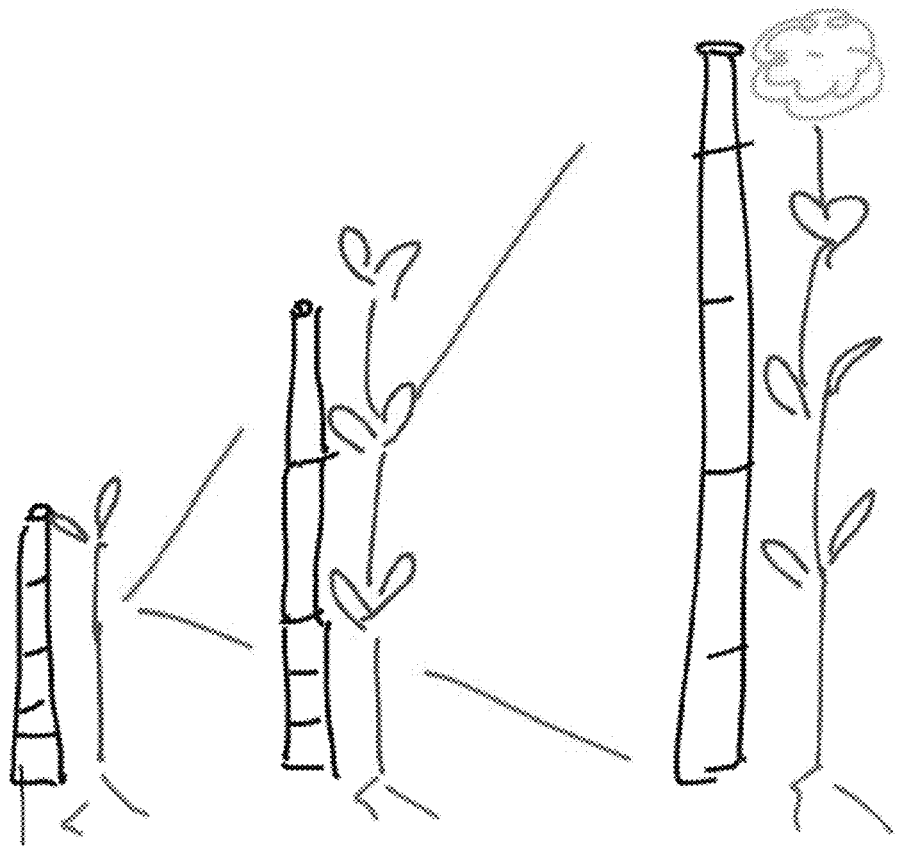
FIG. 2 is a side view of an Extend-a-Stake of embodiments of the present invention.

FIG. 2 shows an Extend-a-Stake, preferably constructed of modular light-weight telescoping rods in various lengths (e.g., 18", 30", 40" and 60"). Made of sustainably grown and produced materials (e.g., vegetable-dyed reconstituted bamboo fiber) or other lightweight material, their length can be tailored to the height of any species as the plant grows or shortens due to harvest or pruning. Removable GroundPosts allow for Extend-a-Stake to be set into the ground without a SLeave. Can be mix and matched with GroundPosts, SLeaves, Finials, Caddies and FlexiBases. Extend-a-Stake may last 3-5 years or longer when left out of doors in the ground in climates where the ground does not freeze.

In alternative embodiments, FlexiStake and Extend-a-Stake may be topped with a flat-topped button or Finial that screws into or snap onto the upper segment of the dark green rod (other colors are possible). These are preferably made of rust-proof, durable material such as plastic, aluminum, fiberglass, bamboo fiber or coated steel. The standard Finial can be replaced by other screw-in or snap on/off finials that aid in seeing the stake terminus. Finial also function to protect the eyes (round), indicate the flower color of the species (yellow, blue, red, orange, etc.), or give a decorative flair to a garden (spheres, fairies, geometric shapes, dragonflies, fruits, vegetables, seeds, nuts, animals, insects, discs or beads, characters or the like. etc.). Each rod is preferably six to twelve inches when fully collapsed.

In an alternative embodiment, internal beacons that use radio frequency or other type of remote location device as part of a Where-IS-It? system may be installed in the upper end model of Finials allow an entire garden to be mapped and displayed online. A radio beacon, GPS, RFID or other passive technology may be combined with online mapping to remotely display the layout of a garden.

Figure 3A:
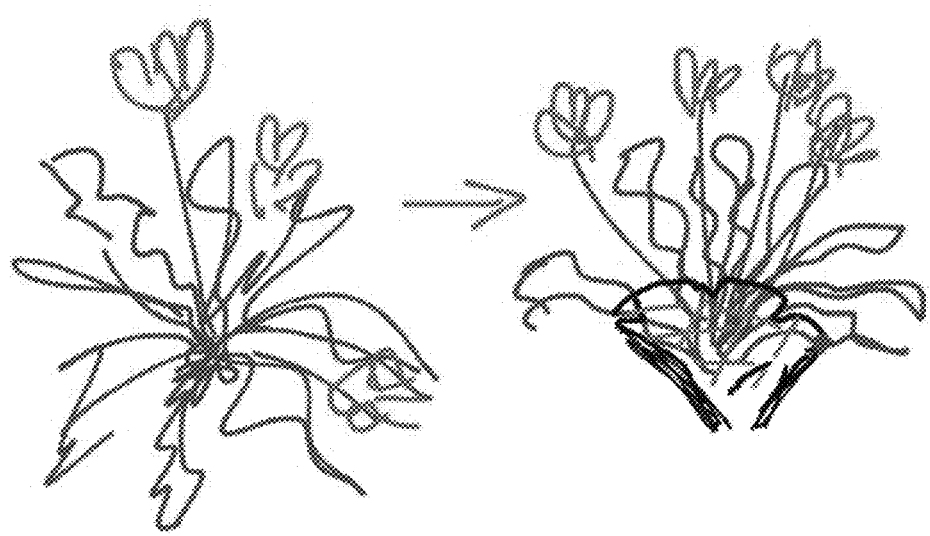
FIGS. 3A-3B are side views of NetStakes of embodiments of the present invention.

FIG. 3A shows NetStakes, preferably constructed of open mesh for holding floppy plants from the ground up, for example, used to wrap and pin floppy plants. FIG. 3 shows such a bundle of floppy plants both before and after application of NetStakes. Camouflage colors of camo-green or camo-brown, these can be moved and shaped in concert with both Extend-a-Stake and FlexiStakes. Works especially well for applications when there are too many stems from one plant to make Flexi-Stake or Extend-A-Stake practical.

Figure 3B:
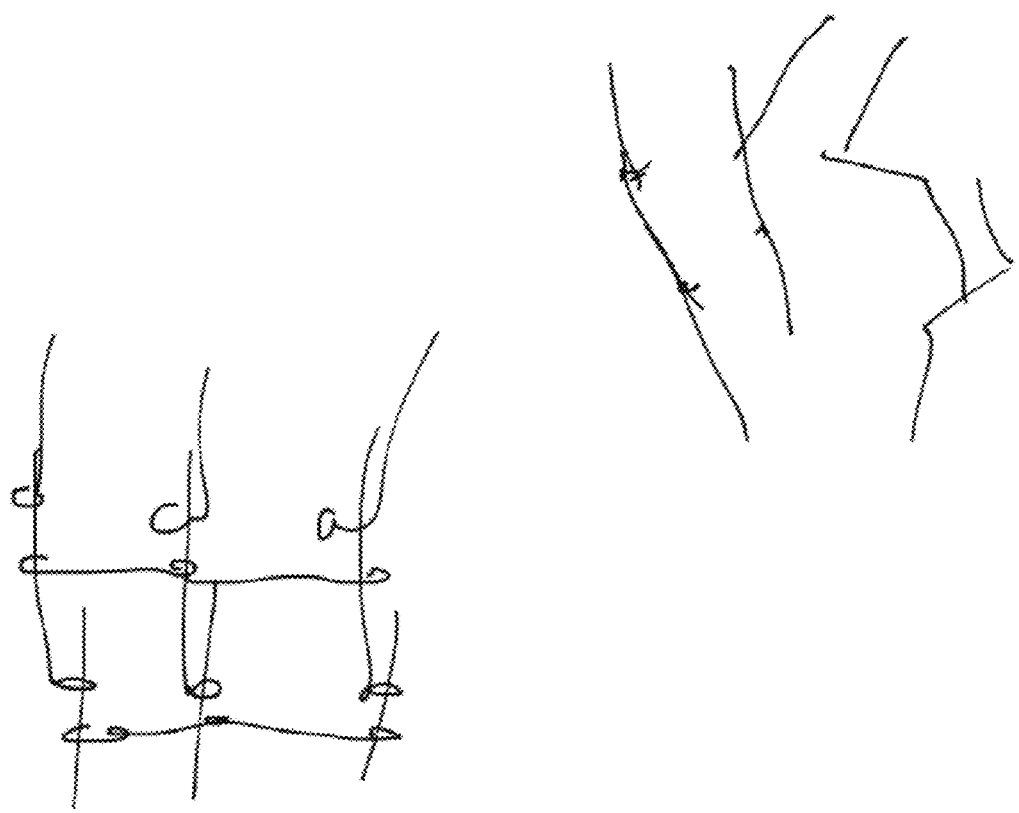

FIG. 3B shows an alternative embodiment of NetStakes using flexible mesh and a kinkable net used to wrap and hold floppy plants in place.

Figure 4A:
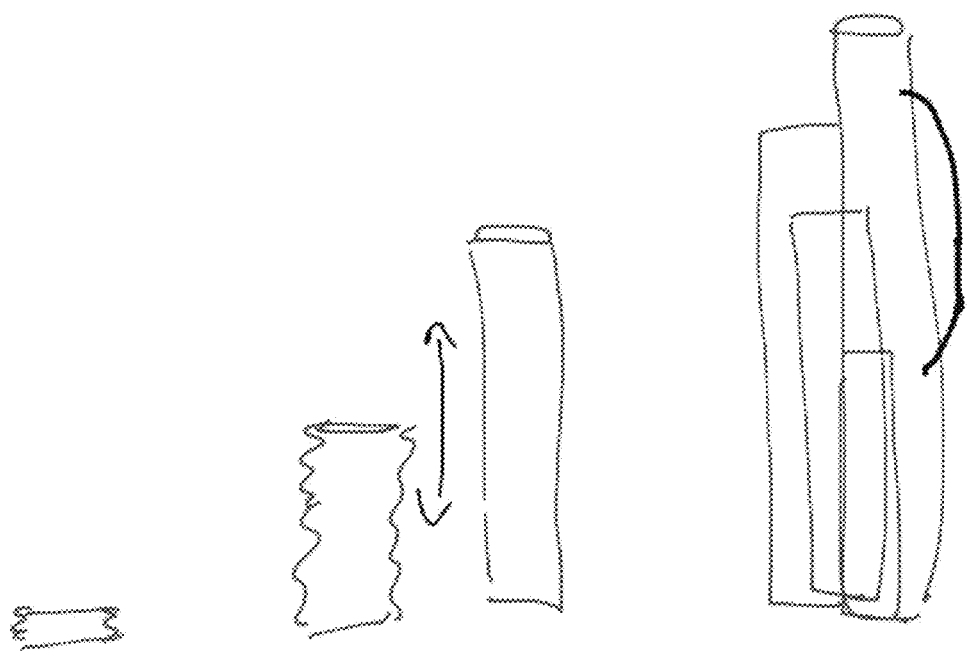
FIG. 4A is a side view of Caddies of embodiments of the present invention.

FIG. 4A shows Caddies, preferably constructed of nylon, canvas or other mesh in earth-tone colors that dry quickly and easily. The fabric is supported by a spring inserted into a spiral pocket sewn or glued in the mesh. The spiral allows the caddies to open and stay open, including extended, or to be collapsed for storage. For example, length may be adjusted from essentially flat to more than three feet. Preferably they have a diameter of three to six inches. A handle or carrying strap may be added for ease of transport. Extend-a-Stake are easy to store in our lightweight, durable pop-up Caddies. A mesh tag allows the Caddie, with or without stakes inside it, to be hung for storage or drying.

Figure 4B:
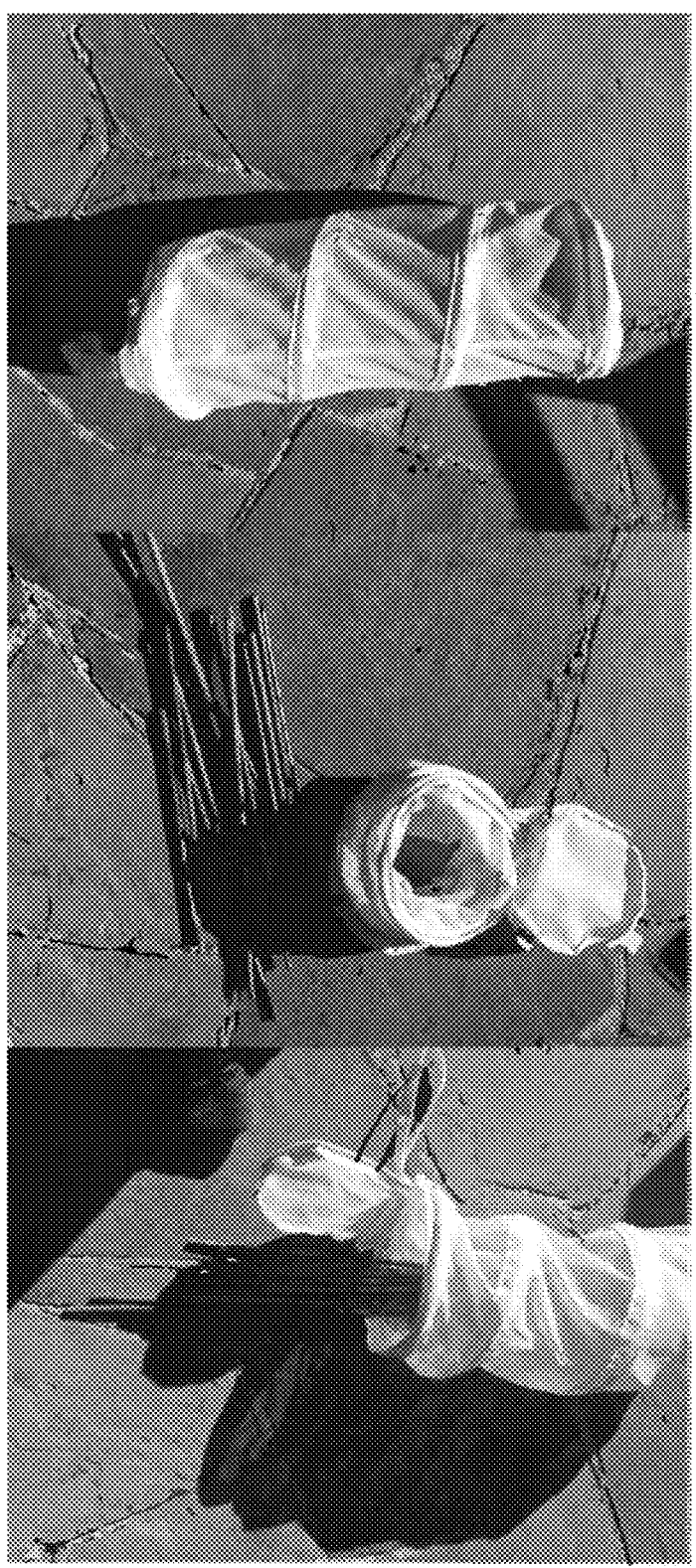
FIG. 4B are photographs showing side and top views of embodiments of Caddies constructed of nylon mesh.

FIG. 4B shows an embodiment of Caddies constructed of nylon mesh.

Figure 4C:
FIG. 4C are photographs showing side views of embodiments of Caddies constructed of tubing and wiring framing.

FIG. 4C shows an embodiment of Caddies constructed of tubing and wiring framing. One option is to add a bundle of tubes to facilitate storage and carrying of multiple distinct bundles.

Figure 5A:
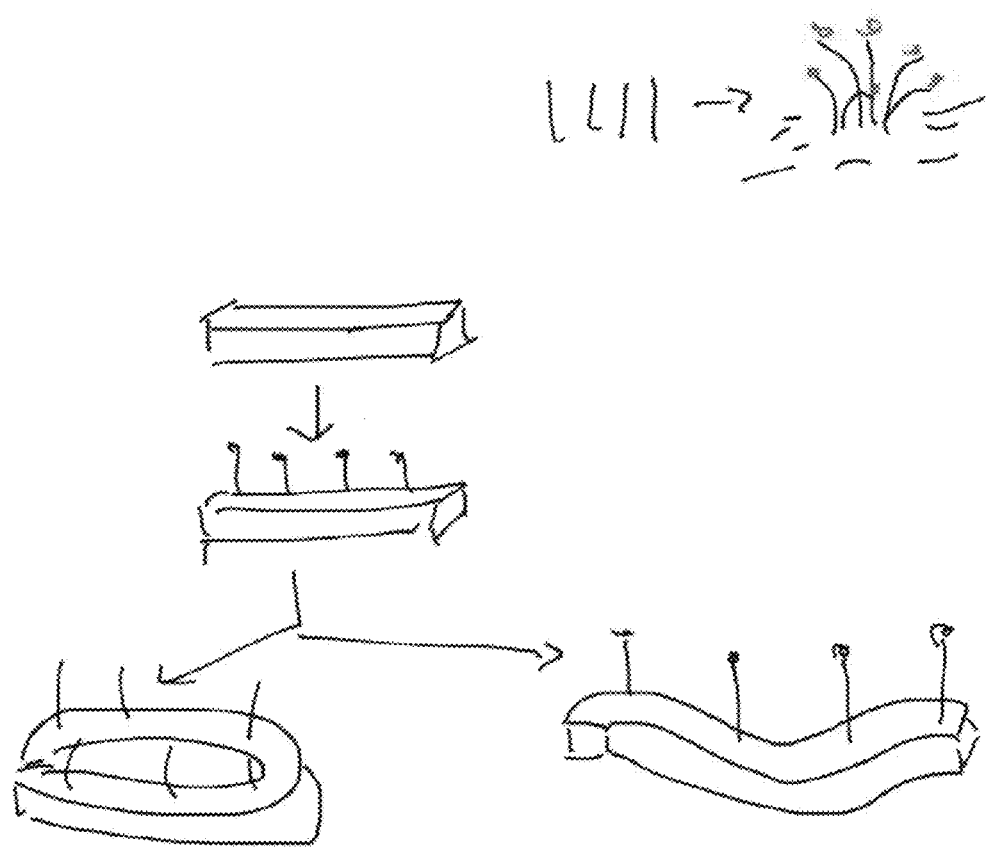
FIGS. 5A-5C are side views of Flexi-Base of embodiments of the present invention.

FIG. 5A shows Flexi-Base, preferably constructed of flexible material, for example those used to make architect's rulers (e.g., malleable wood, rubber, synthetic materials, etc.) Extend-a-Stake and Flexistakes can be adapted for use with multi-stemmed plants (e.g., Delphiniums) by removing the underground pin and screwing or otherwise attaching the bottom end(s) into a Flexi-Base and then shaping the Flexi-Base around or through the plant that needs staking. A line of easy-to-use, attachable clips will allow Extend-a-Stake to hold the stems, flowers and fruits of plants as they grow.

Figure 5B:
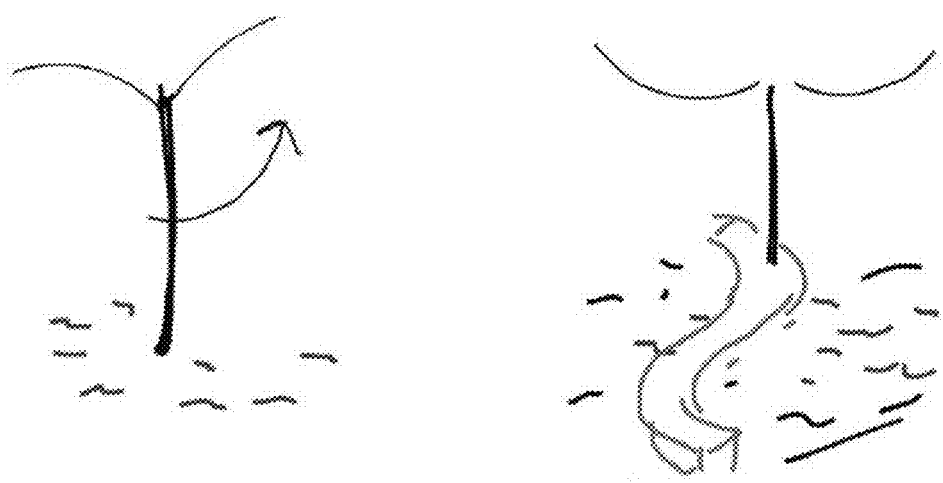

FIG. 5B shows an embodiment of Flexi-Base customized to the curved layout of the particular garden.

Figure 5C:
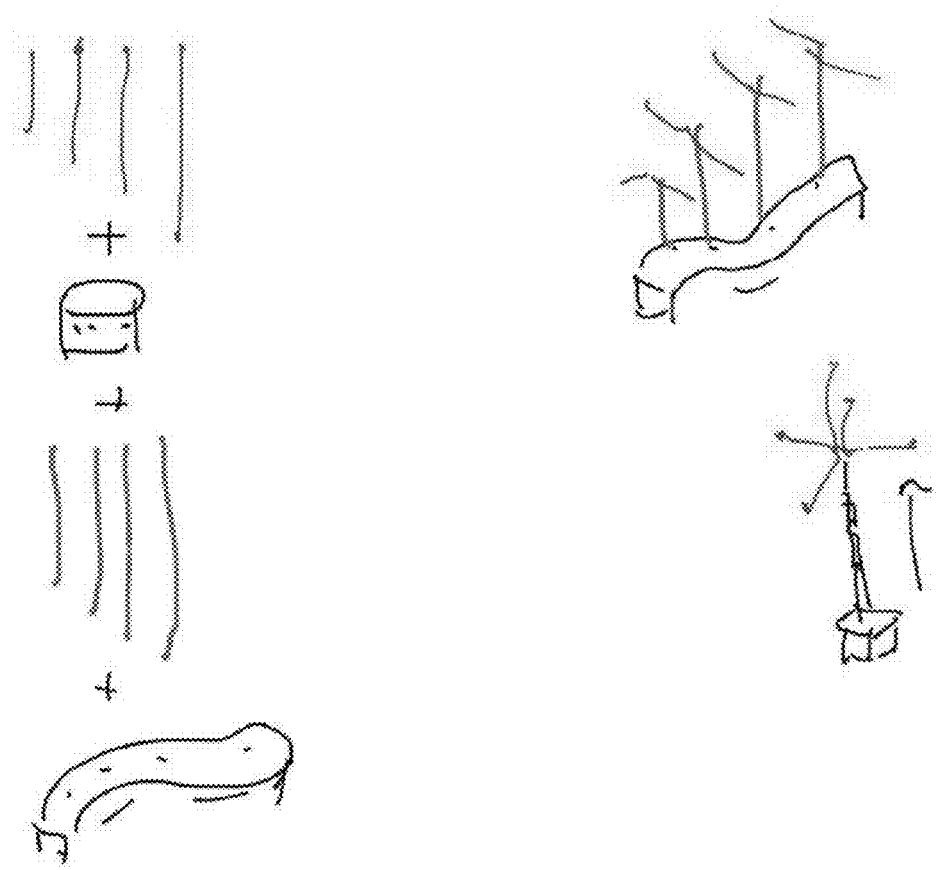

FIG. 5C shows an embodiment of Flexi-Base customized for use at a single staking location, along a line of stakes or adjustable over uneven terrain. Also shows an alternative use in a preexisting pot or vase.

Figure 6A:
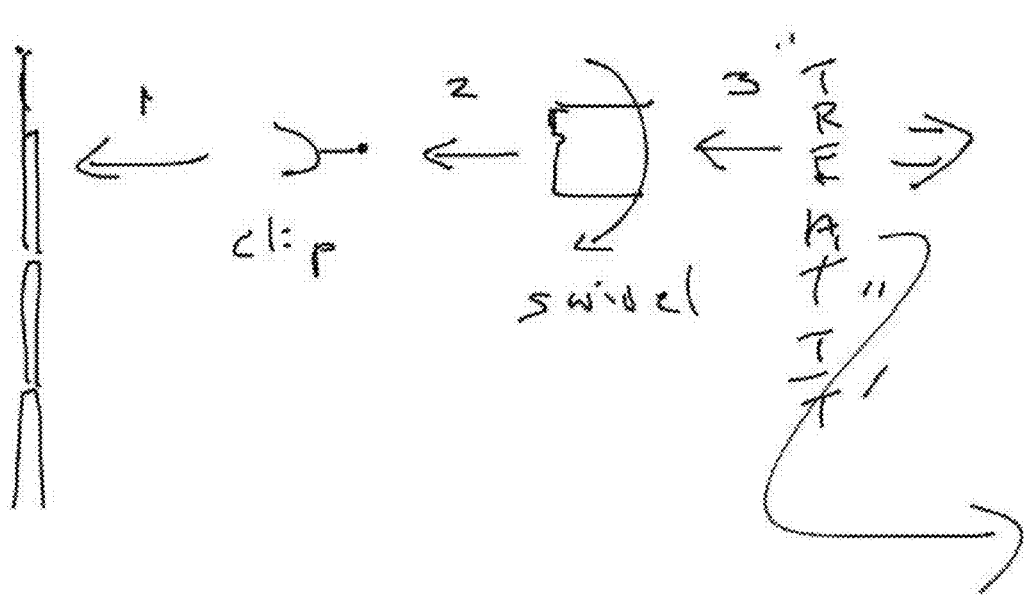
FIG. 6A-6C are side views of Stake Treats of embodiments of the present invention.
Figure 6B:
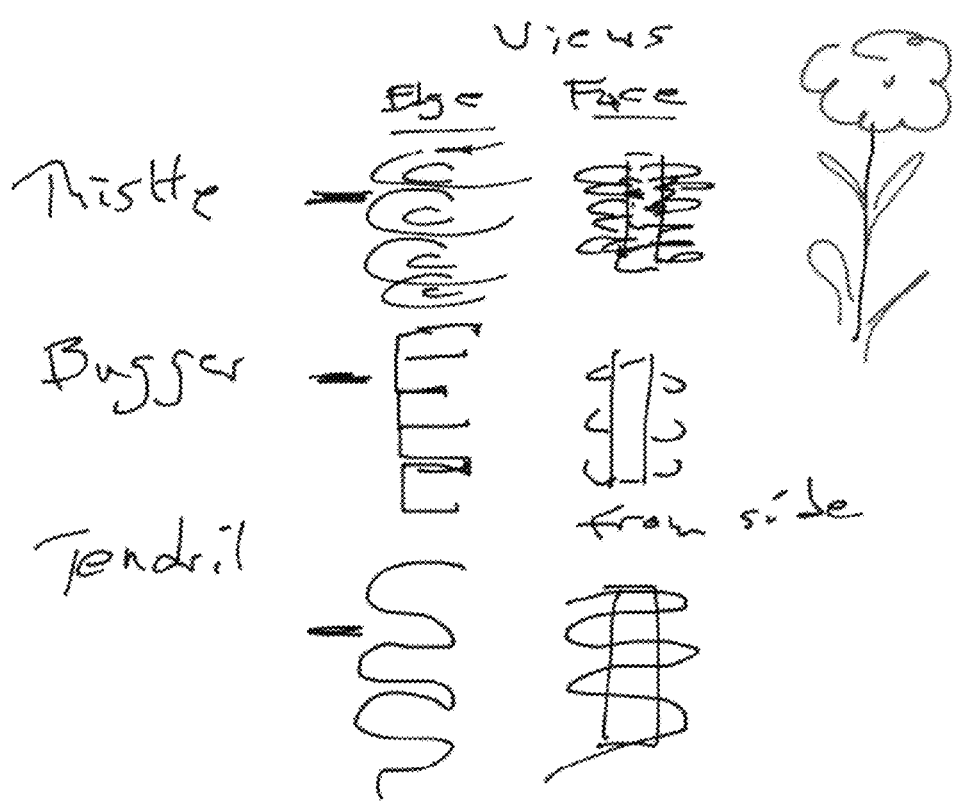
Figure 6C:
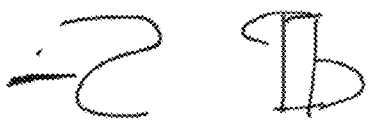

FIG. 6A-6C shows Stake Treats, which may be added a top Finial or clip as many as you need anywhere along the length of your Extend-A-Stake or FlexiStake to hold the branch, stem or flower of your choice. The basic system comes in three modular parts: stake-facing, central rotating mechanism and plant-facing bristle. The stake-facing side comes in various diameters so it can clip onto any diameter of Flexi-Stake or Extend-a-Stake or bamboo. The central rotating mechanism clips onto both the stake-facing and the bristle sides of each unit. The plant-facing portions a.k.a. "bristles" come in various sizes and bristle type and complexity. Bristles can be made of man-made, microbial-generated or natural materials. Bristles can be clipped or snapped onto the central rotating mechanism.

Thistle gently grips stems of any diameter (modeled after a thistle head with curved, flexible bristles of various lengths and sizes). Super Thistle has extra holding power;

Bugger works best for a single stem (like a bug's legs with single flexible layer). These come in hinged or fixed and flexible formats;

Tendril is a 1-5 loop coil that you can press into or wrap onto a stem to hold it in place;

Vine is a single coil or open spiral that rotates 90 degrees to slide past, then swivel around a stem;

Moon are open circles that allow stem to pass into and then rotate to hold it;

FlexiHead is a miniature FlexiStake that mounts like a finial and works like a Flexi-stake to embrace a stem.

Other shapes and styles may be incorporated.

Figure 7:
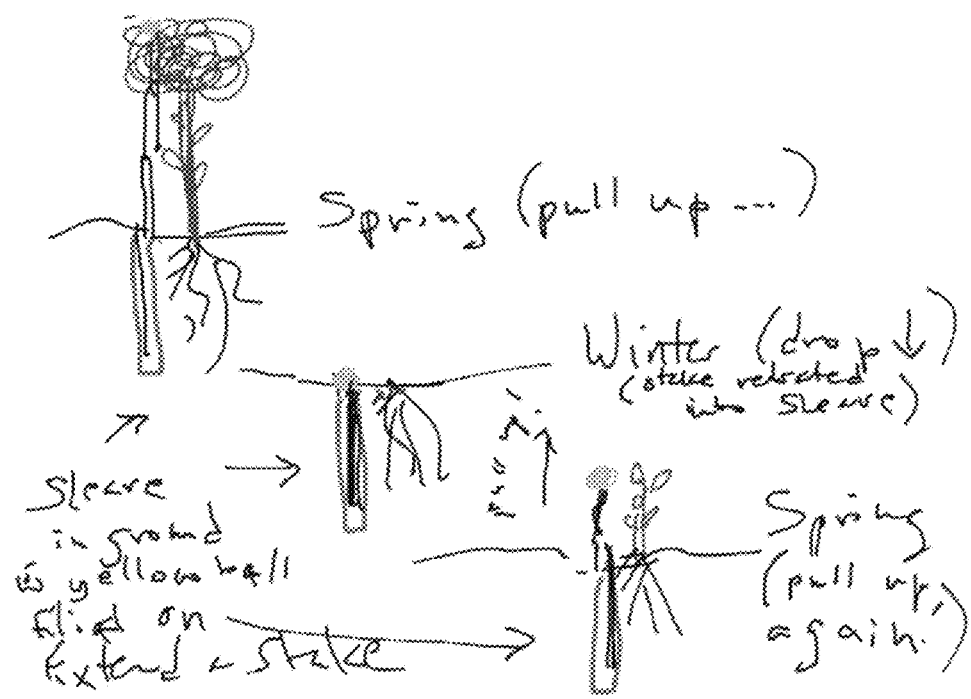
FIG. 7 are side views of Sleaves of embodiments of the present invention.

FIG. 7 shows Sleaves, which may be used to extend the lifespan of stakes. SLeaves preferably have a gasket so that any finial style atop the Extend-a-Stake makes a sealed underground unit. Left collapsed in place year-round with only their finials showing (e.g., picture a small cluster of mushrooms), Extend-a-Stake mark the position of a plant without being unsightly while not in use, sticking out of the ground. They can also color-code the position of deciduous bulbs or perennials, and are ready to be deployed when spring comes. This helps find plants—those you want to keep, those you want to move, those you want to divide—and avoids driving a new stake into the ground each year saving valuable time and preventing damage to both the root structures and the soil.

Figure 8:
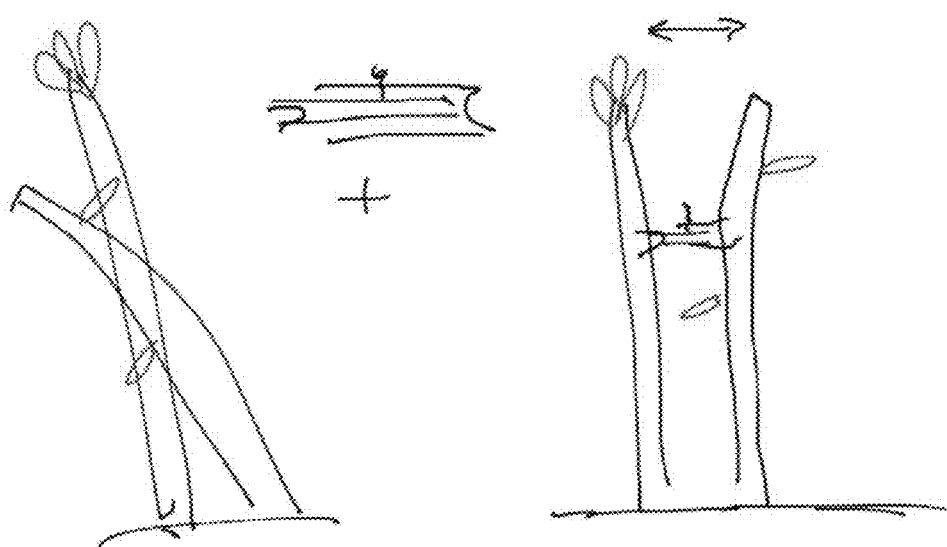
FIG. 8 are side views of Selfie Stakes of embodiments of the present invention.

FIG. 8 shows Selfie Stakes, which are preferably made of an adjustable length rod (like a slide rule with a set screw) and c-shaped, padded ends that facilitates spreading and shaping the inside of a tree or shrub using its own branch structure. Remove after a season or two and the plant will hold its own shape. Unlike wires, does not girdle the cambium. Simple and elegant, these are camouflaged so only the plant knows it's there. Preferably made of wood, bamboo, plastic, polymer, ceramic, metal or coated metal.

Figure 9:
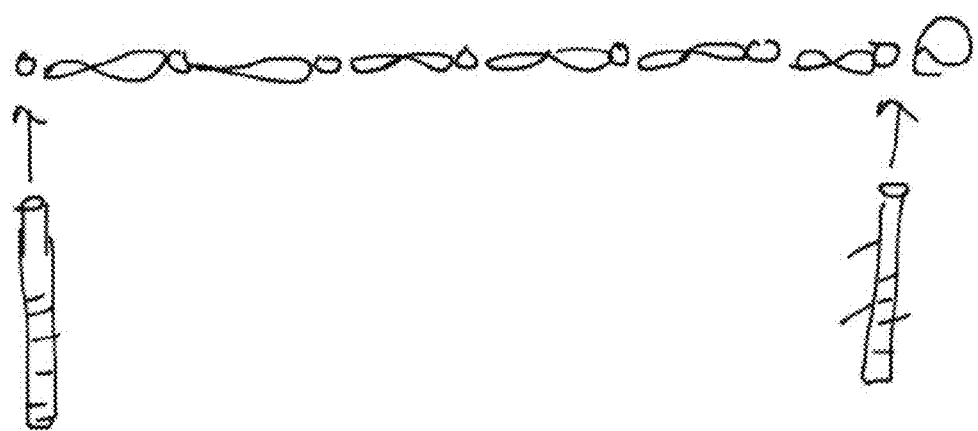
FIG. 9 is a side view of StretchiChain of embodiments of the present invention.

FIG. 9 shows StretchiChain, preferably a lacey chain that stretches from traditional bamboo stakes, Flexi- or Extend-a-Stakes to hold back vegetation from a walkway or to shape it within a bed. Preferably made of polymer, metal mesh with or without polymer coating, plastic, nylon or any combination thereof. May have variable widths, and be UV resistant or alternatively biodegradable. Additional links may be added as the plants grow.

Trellising

Figure 10:
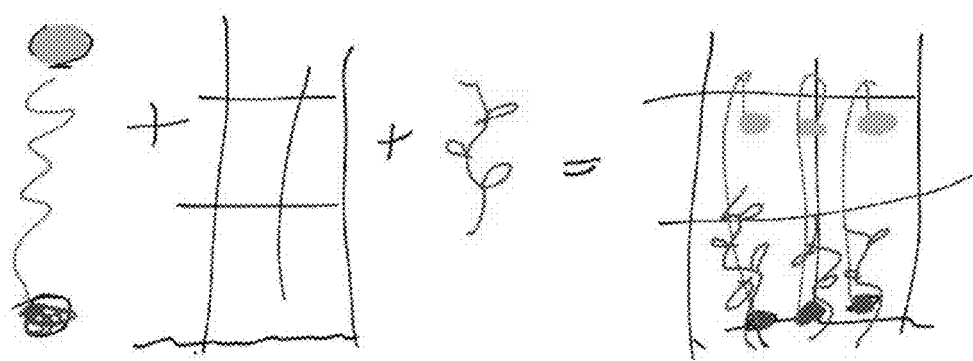
FIG. 10 are side views of Stringables of embodiments of the present invention.

FIG. 10 shows Stringables, which are a string with weights on each end that you can toss over a bar and down to the ground so that vines such as peas and beans will have a place to climb. A central spooling mechanism allows the length of the line to be adjusted in situ or wound up for easy storage. String is preferably made of natural fiber or a barbed synthetic that encourages tendrils to attach or comes as a smooth version that can be decorated with open tubed barbs or miniature Finials, and are designed to be reusable.

Figure 11:
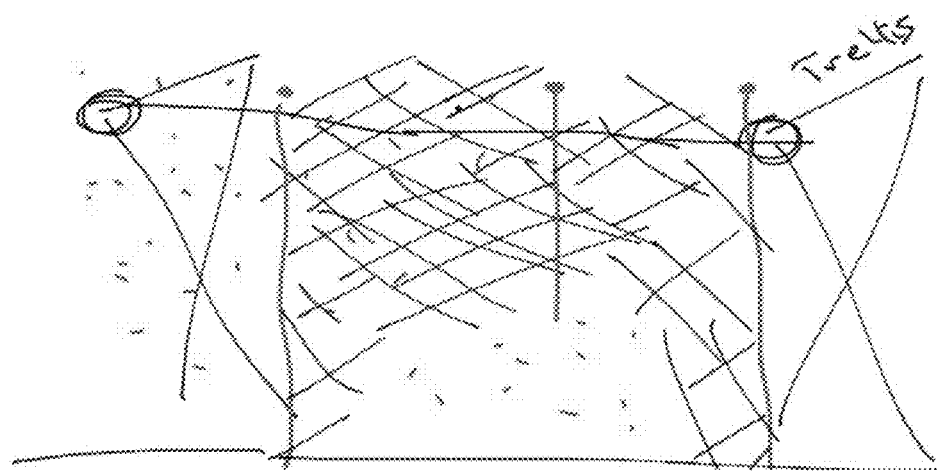
FIG. 11 is a side view of NothingButNet of embodiments of the present invention.

FIG. 11 shows NothingButNet, a system for fending off birds from berries and other edibles. Toggle and line assembly at adjustable intervals (1', 2', 3', etc.) allows net to be lifted and then dropped back down for harvesting fruits. Sturdy arced or inverted triangular supports spaced at 6-8' intervals are attractive enough to be left in place year round. In the illustration, the net may be pulled up using cords. Rings on the trellis are preferably designed to be removable for winter storage.

Figure 12A:
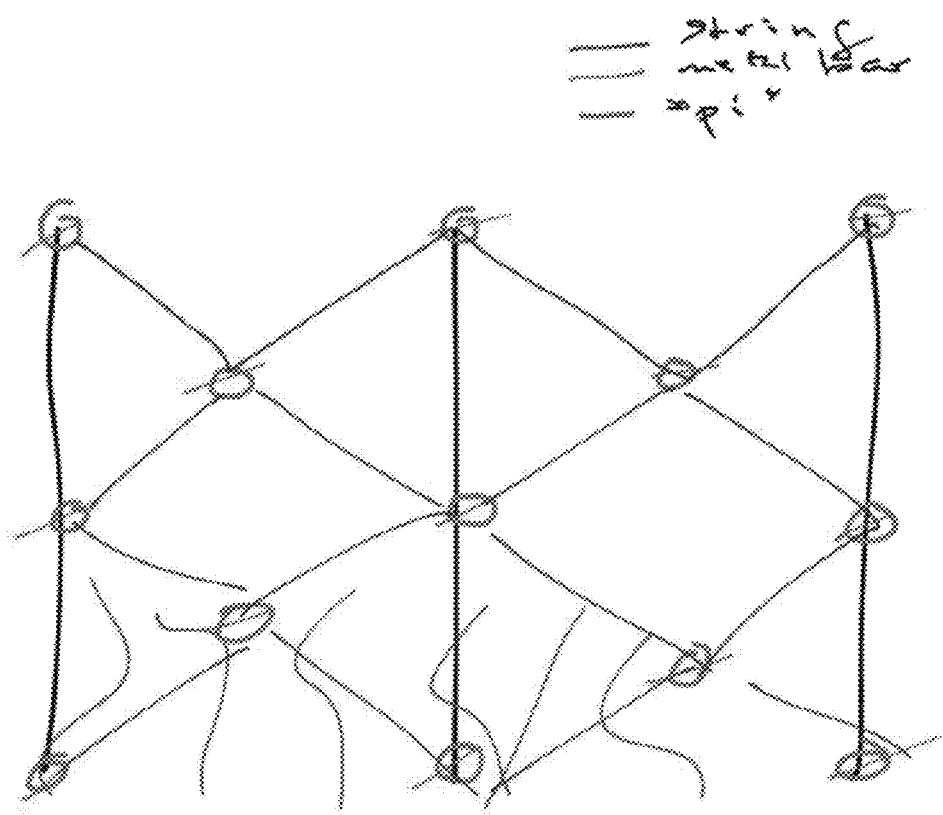
FIGS. 12A-12B are side views of DeVine-Align of embodiments of the present invention.
Figure 12B:
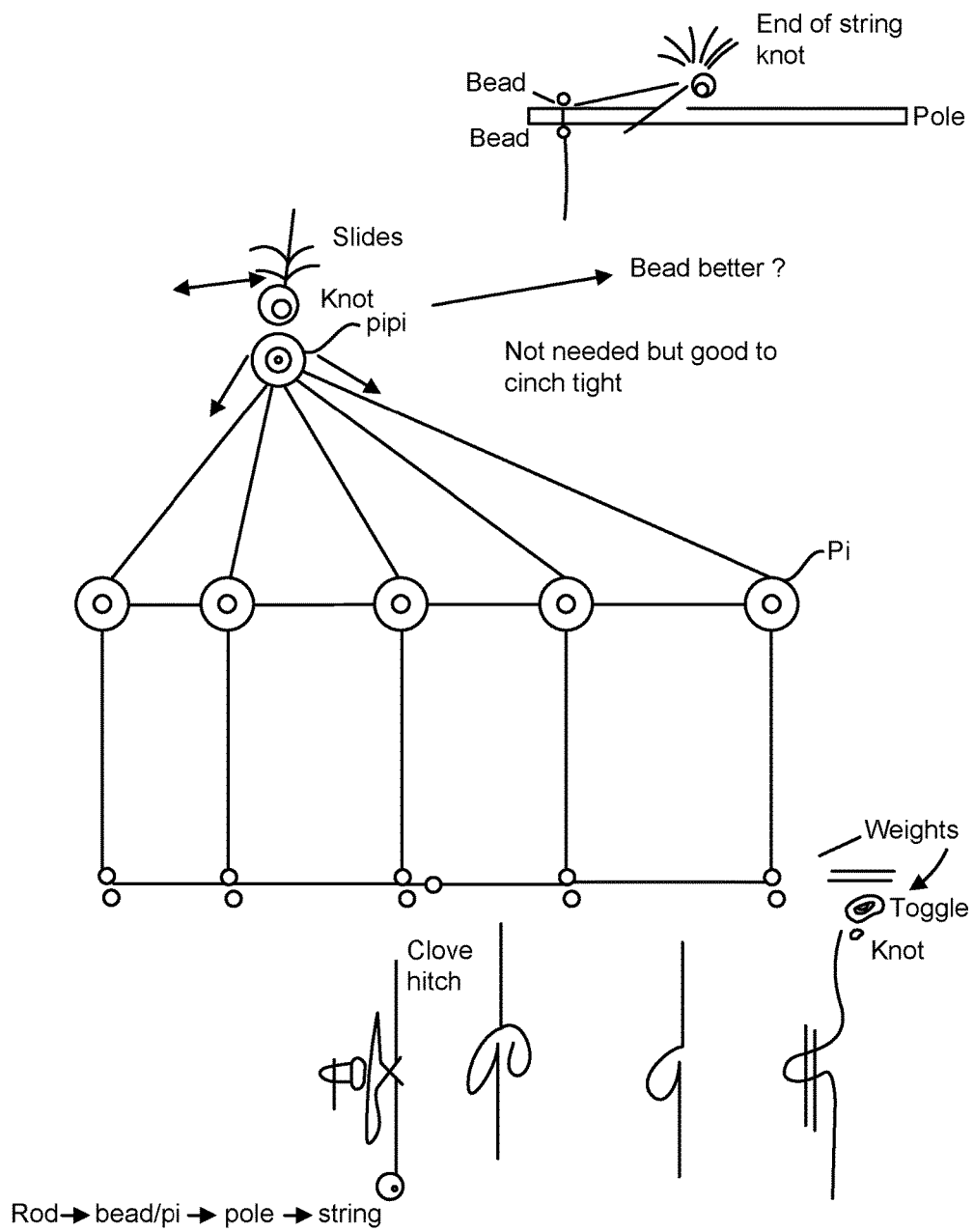
Figure 12C:
FIG. 12C are photographs showing DeVine-Align embodiments of the present invention.

FIGS. 12A-12C show DeVine-Align, a modular trellis system for vines such as peas or beans constructed of natural materials. Adjustable spacing and the height, these come in styles—plain and functional or pretty and fun—to suit a wide range consumers of all ages. Strings are looped through stone, metal or plastic doughnut-shapes (rounds, squares, ovals, etc.) or an actual Chinese "pi" or coin with a central hole). These are held in place along the string with bars made of a variety of materials (e.g., metal, bamboo, wooden, plastic, polymer, clay or ceramic). A bottom weight completes the structural needs. Designer variations on string, pi, top decorations, bottom weights. Practical to leave in place year after year.

Basic Gardening Arts

Figure 13A:
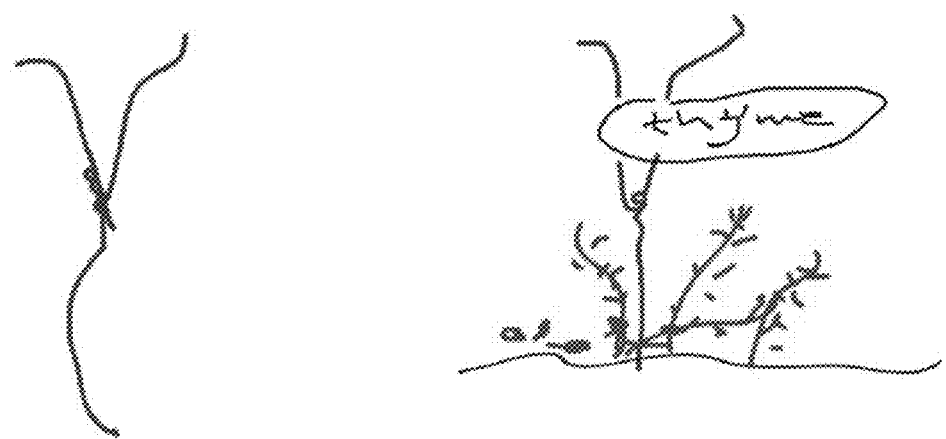
FIG. 13A is a side view of Namesayers of embodiments of the present invention.
Figure 13B:
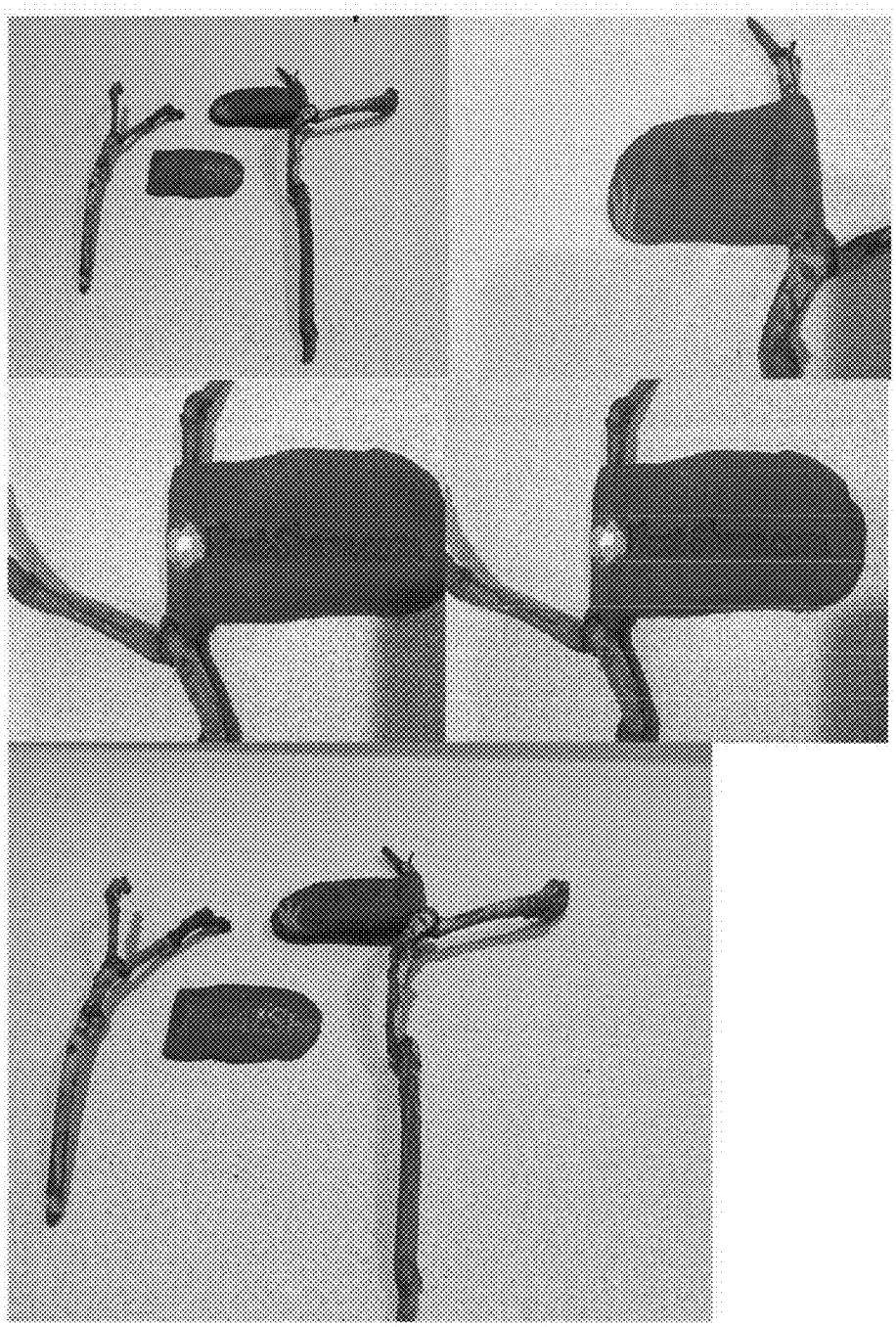
FIG. 13B are photographs showing Namesayers embodiments of the present invention.

FIGS. 13A-13B show Namesayers, a plant labeling system that includes identification tags or labels that are hand-crafted out of durable, colorful material (e.g., clay, Fimo, Sculpy, etc.) that is manufactured to resist weathering. Each tag is stamped and embossed with the name of the plant. Labels, such as lettering and designs can or cannot have additives applied to them to enhance visibility (e.g., ink and or embossing powder, etc.) or décor (sequins, glitter, etc.). A raised or embossed sculpture of the plant in a contrasting color to the base is placed next to the species name. Tags are affixed to a weather-resistant supports, for example twigs from *Arbutus unedo* or other weather resistant species, plastic, metal or other material, each of a unique shape. Wooden twigs are treated with oil or other wood treatment to prolong outdoor use to enhance durability. Examples including four styles of tags, with and without a twig, are tailored to suit the size and shape of each species are shown. Tags with twigs can be pushed into the soil, preferably via a pointed end of the support. Horizontal or vertical tags lacking twigs hang from a colorful or neutral nylon/silk/hemp/jute/cotton cord. Height is adjustable with beads on either end of the cord. Great for named hybrids (roses, dahlias, etc.) or herbs, perennials, etc. Advantages of the present invention over the prior art may include:

deformable natural materials (e.g., a vine, rattan or branches);

internal structure(s), especially a malleable sandwich type construction, that can be shaped into complex 2D or 3D forms;

multi-step methods of construction, weather resistant processing and curing;

added in-ground (or hanging) support of label; and visual identification of species with an option for electronic identification of label itself and species from a distance.

In an alternative embodiment, internal beacons that use radio frequency or other type of remote location device as part of the plant labeling system. The beacons may be may be installed in the supports or tags or incorporated into the labels to allow an entire garden to be mapped and displayed online. A radio beacon, GPS, RFID or other passive technology may be combined with online mapping to remotely display the layout of a garden. The beacon may include receivers, transmitters or transceivers. In an alternative embodiment, passive or active power may be incorporated into the system to providing illumination, coloring of other means of identification. UPC/bar codes or other identification frequently used for commercial application may also be included.

The preferred steps in the production of Namesayers are outlined below, broken into discrete production stages. It will be appreciated that the order of many of the steps and production stages may be varied to accommodate manufacturing tolerances and logistics. Also, many of the steps are optional and may be excluded for particular applications.

The support preparation steps of a preferred methodology for Namesayer production are outlined as follows:

A. Select support material from stiff or flexible species (e.g., straight or curved or forked branch from hardwood, or vine that can be woven or deformed) as appropriate to label target species.

B. Remove unwanted portions of support (e.g., strip off leaves, tendrils or thorns or damaged portions) to create desired final shape and size as dictated by target species mature size, shape and growth habit.

C. Shape as desired, e.g., weave, twist into wreath, etc.

D. Air dry completely or until needed. Duration depends on support material (i.e. species, hardness of wood, and diameter of branch at the thickest point) and probability of infestation.

E. Discard any insect or bug or fungus infested material.

F. Use either heat, cold or a combination to kill insects and other organisms. For example, freeze ≤0 F for ≥36 h or heat with/without convection from 0.5-96 h until dry and no longer smells or outgasses.

G. Remove or discard any remaining insect, bug or fungus infested material.

H. Repeat steps E.-G. as needed.

I. Coat with weather resistant product or insect resistant oil (e.g., teak, citronella etc.) or lacquer (clear or colored) to match desired end product and species.

J. Air dry ≥0.5 h as determined by the weather resistant material or until needed.

The pre-form preparation steps of a preferred methodology for Namesayer production are outlined as follows:

A. Mix malleable material that becomes weather resistant when cured (e.g., ceramic or clay or polymer such as Fimo or Sculpey that hardens on baking) to color specifications B. Roll out material in from step A into sheets manually (e.g., with rolling pin) or a machine (e.g., with spaghetti maker or commercial machinery)

The pre-form internal structure steps of a preferred methodology for Namesayer production are outlined as follows:

A. Embed pre-form sheet into flat, malleable support matrix (e.g., metal mesh, plastic mesh; cloth)

B. Add optional hanging system to the matrix of the pre-form, e.g., swivels, wire or tubes for passing a wire through C. Repeat pre-form preparation step B on opposite side of mesh making a tri-layered "sandwich"

D. Cut "sandwich" into desired shape and size

The label external surface of pre-form steps of a preferred methodology for Namesayer production are outlined as follows:

A. Optionally add company visual identity system (i.e., icon, logo, wordmark, Seal) into pre-form B. Add target plant species common and/or Latin name into pre-form C. Optionally stamp or add desired UPC code or electronic chip or radio frequency ID tag to pre-form The assembly of support with pre-form steps of a preferred methodology for Namesayer production are outlined as follows:

A. Attach pre-formed label to prepared twig or branch or other support or punch holes into label on one end so that label can be hung or attached from living plant directly by a weather resistant wire or string B. Sew matrix (mesh) together with stability material, e.g., cladded, plain, braded or straight wire or fiber (e.g., hemp, rattan, silk, etc.) as needed for stability of final shape C. Cover any exposed wire with additional clay The make and add company visual identity system steps of a preferred methodology for Namesayer production are outlined as follows:

A. Make large diameter icon/seal/logo/wordmark/design mark or any combination thereof B. Size cane by stretching or rolling to desired diameter C. Add to pre-form, e.g., press and flatten directly onto preform; add as a decorative button; place partly on and partly off pre-form The final assembly and finishing of label steps of a preferred methodology for Namesayer production are outlined as follows:

A. Add decorative elements (e.g., embossing powder), raised elements, indented elements from commercial or natural elements in same or contrasting color(s)

B. Add natural objects (e.g., seed pods, seeds, etc.) cured in same manner as Supports (see support preparation steps, supra) in same or contrasting color(s)

C. Shape, deform or wrap into desired 2 dimensional shape. Some labels, e.g., for a rose bush, will skip step D.

D. If desired, further shape or deform or wrap into geometrical or freeform 3-dimensional shape around the support structure (e.g., conical, spherical, pyramidal or freeform)

Figure 14:
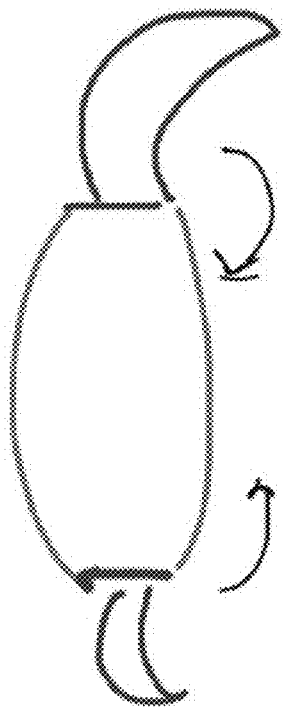
FIG. 14 is a side view of Heading Hook embodiments of the present invention.
Figure 15A:
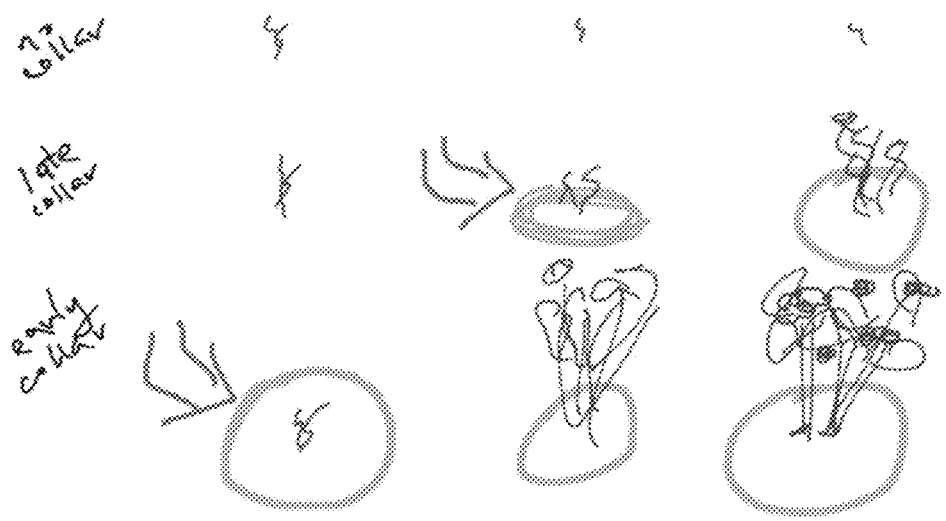
FIG. 15A is a side view of Cop Collars embodiments of the present invention.
Figure 15B:
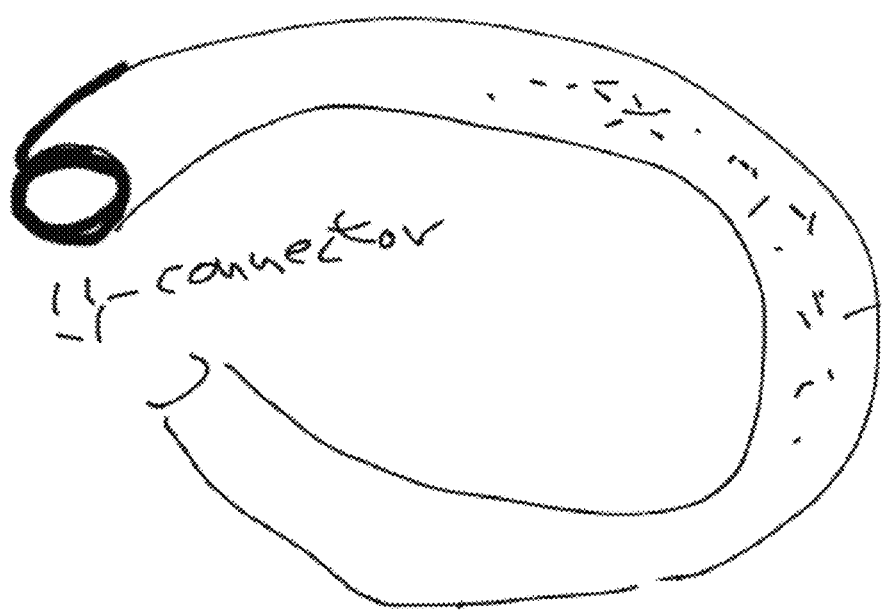
FIG. 15B is a top view of a Cop Collars embodiment of the present invention.
Figure 15C:
FIGS. 15C-15E are photographs showing Cop Collars embodiments of the present invention.
Figure 15D:
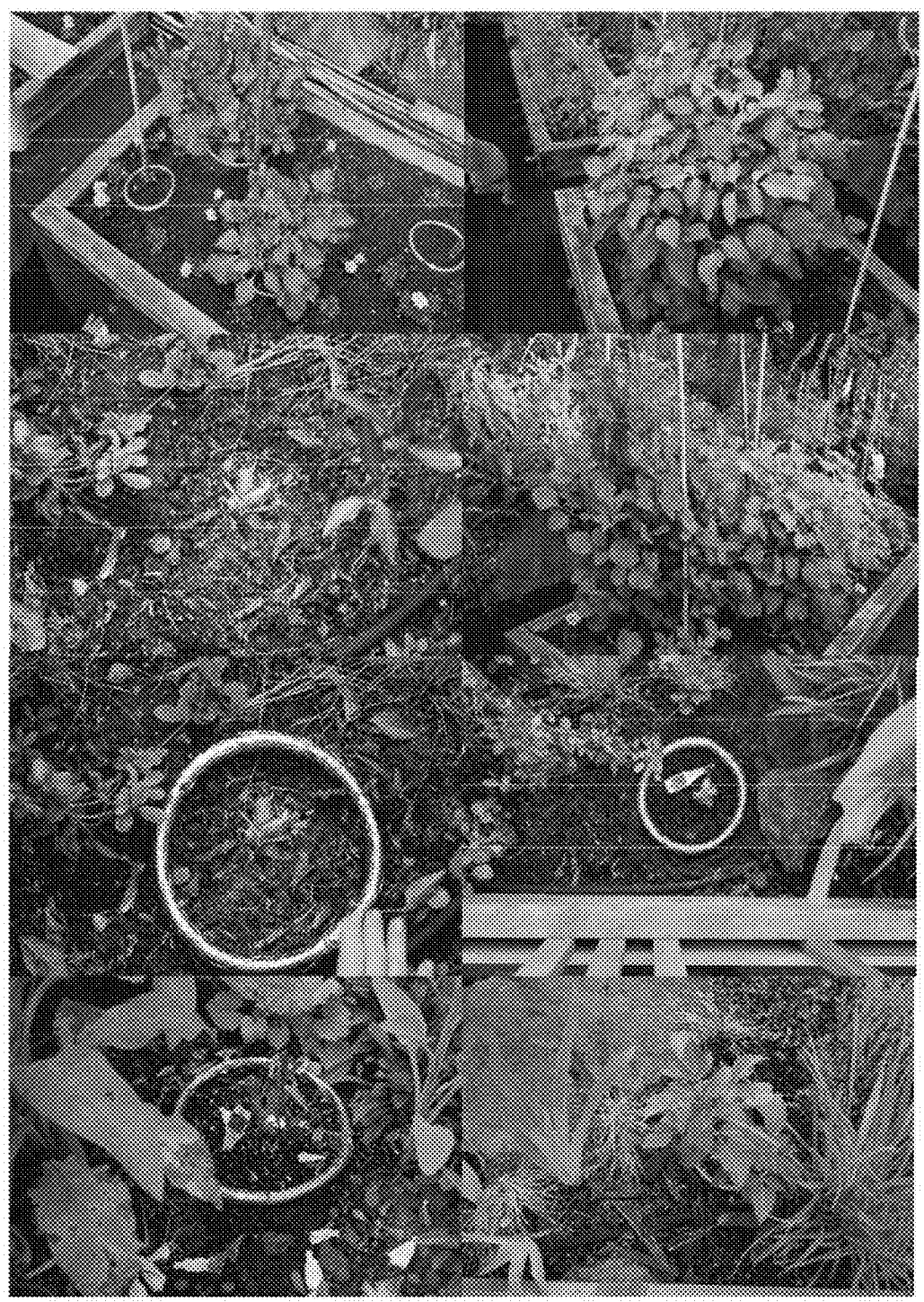
Figure 15E:
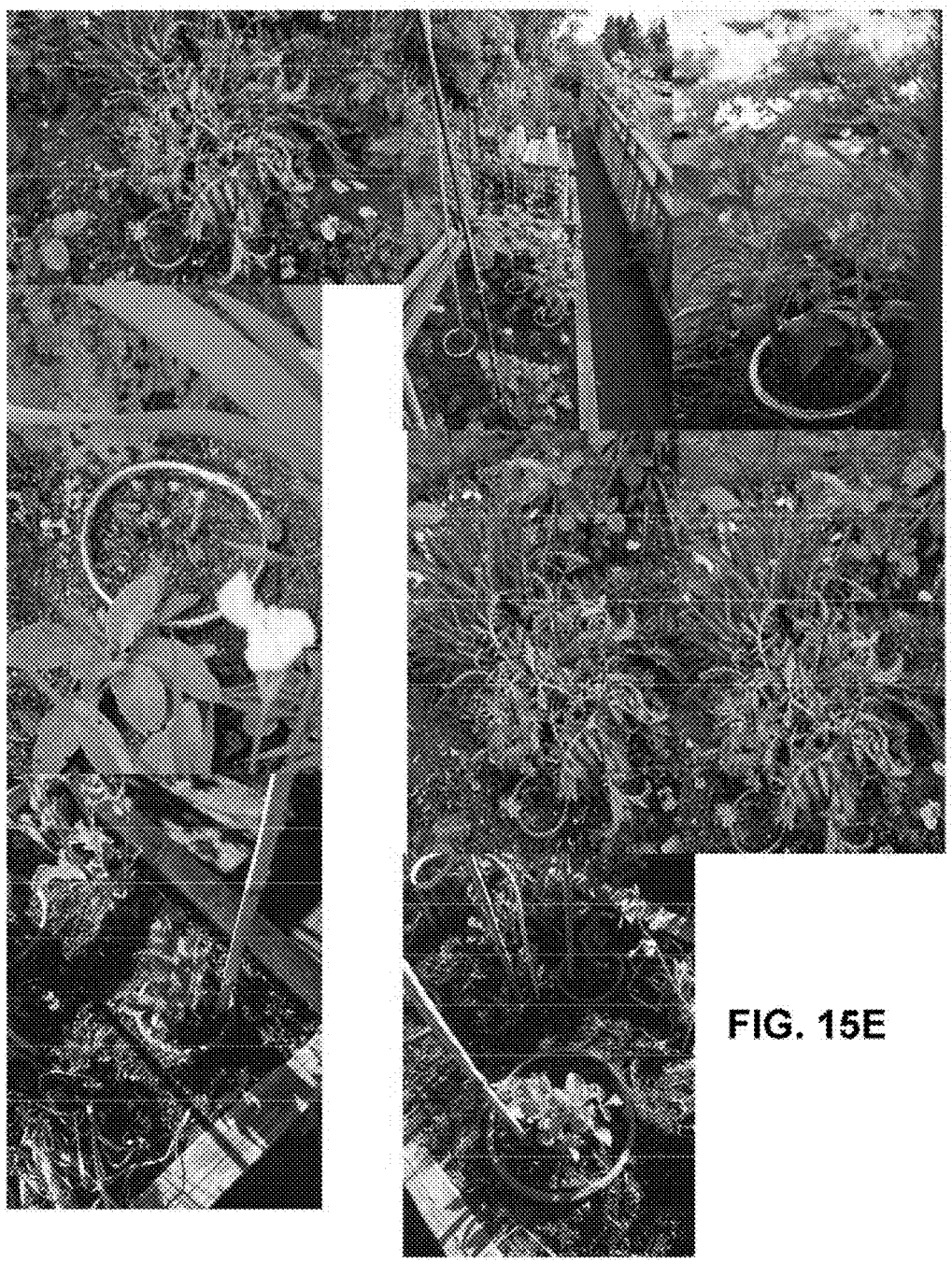

E. Bake at 50-500 F for 0.5-96 hours as warranted to harden and cure material and other materials individually and to each other The quality control steps of a preferred methodology for Namesayer production are outlined as follows:

A. Cover any exposed internal structures with material or decorative or natural elements as in final assembly and finishing of label steps A-D B. Repeat final assembly and finishing of label step E to cure added materials The label steps of a preferred methodology for Namesayer production are outlined as follows:

A. Run line (e.g., cladded braided wire, nylon or silk) through channel in interior of pre-form B. Add mechanism to adjust length of line (e.g., beadwork, jewelry clasps, sliding sailor's knots or traditional macramé). Alternatively, attach a spike to the end of label. Alternatively, bury heavy weather resistant base (e.g., made from stone or glass or metal or plastic) that has a drainage hole in it near the plant to be labeled C. Insert finished label into base FIG. 14 shows a Heading Hook, consisting of two half-moon blades folded away into a wooden or easy grip rubber handle. This useful heading blade cuts with a single stroke what a clipper would require the user to grip and release. Saves wrist and fingers with an easy motion. Modular so that variations on blades can be fitted into the handle as needed. Grass, saw, basic hook and elongated hook or blade options may be used. Grips may be plastic, wood or other like materials. Blades and handles preferably made in two or more sizes: long (e.g., 7-10") and short (e.g., 4-6").

FIGS. 15A-15E show expandable and modular Cop Collars, used to keep away snails and slugs. Weighted to stay in place and easy to move, weed under or expand the diameter as your plants grow. Cop Collars are more effective the longer they stay in place. Preferably made of polymer, rubber or other flexible outdoor worthy tubing (e.g., Tygon tubing) in basic 1', 2', 3' lengths are held in a ring with either 1 double-sided or a female/male pair of hose barbs. Addition of shorter sections (4"-12" increments) to the basic tubular shape allow diameter of the basic Cop Collar to be adjusted as needed. Square or other shape formats also available. Addition of flat sheet of material (metal, wood, bamboo, plastic or polymer) "enhancer" attaches to under and upper-side of ring to hold ring tight to ground or lift leaves up off the upper surface of the rings enhance efficacy of Cop Collars by removing prior limitations of all other designs: slugs and snails can crawl under other products or on any material that acts as a bridge spanning the upper surface of the material so accessing the plant needing protection. After 3-4 years, give the area a break and see if the slugs and snails return: our results suggest that after a period or 3-4 years, these collars can be removed and slug and snail population is either so reduced or the copper has leached enough into the soil so that the Cop collars are no longer needed in that place and can be deployed elsewhere. Natural and synthetic repellants included in the interior casing are replaceable (return to us, cassettes or injectables). Sold with or without metal cladding, internal natural repellants and/or vertical enhancers. May be weighted with sand or other material.

Containers

Figure 16A:
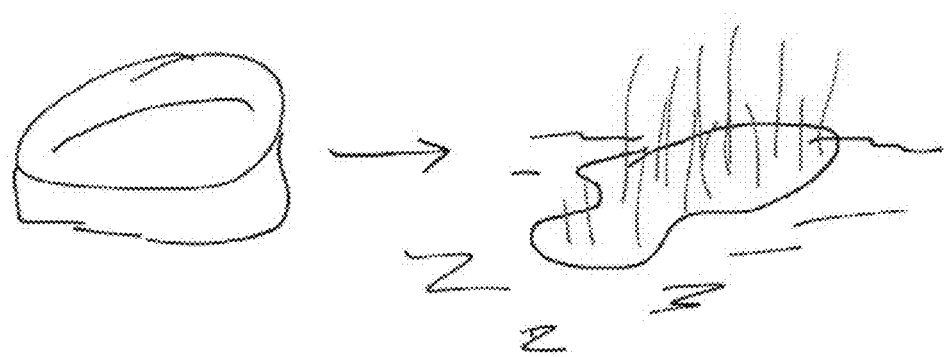
FIGS. 16A-16B are perspective views of Deformables embodiments of the present invention.
Figure 16B:
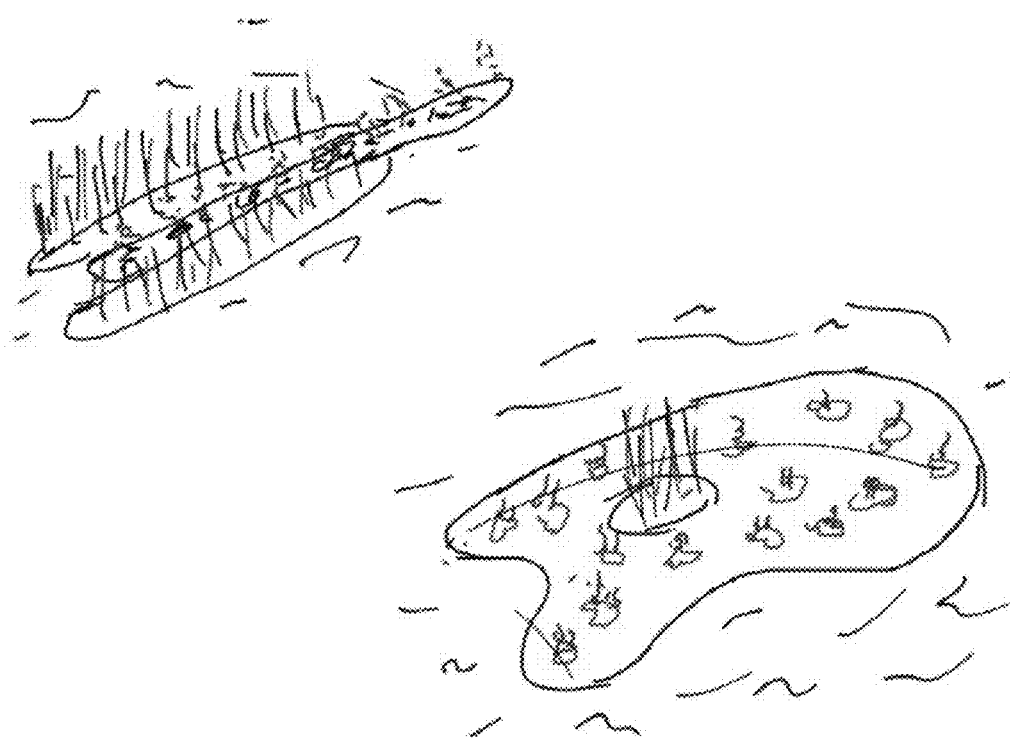

FIGS. 16A-16B show Deformables, malleable and shaped hoop material used to contain desirable plant species or separate invasive plant species. Confine the roots from spreading and create natural beauty in your beds with Deformables. Preferably made of durable plastic/mesh/fabric/wire/combination-of-materials, Deformables last 5-7 years in the ground in climates where the ground does not freeze. Bend and bury these hoops to create swaths, s-shapes, c-shapes or use several to juxtapose species such as grasses in parallel or nest them to create the natural look you desire. From 10 inches to 10 feet in diameter, Deformables come either as hoops 3' or 5" deep appropriate for shallow or deeper root systems. Comes with removable, reusable anchor pins that hold sections in place as you shape other portions of the hoop. Rolled edge or foam C-shaped cap camouflages the upper edge. May be nested or used to contain plant areas of various sizes and configurations.

Figure 17A:
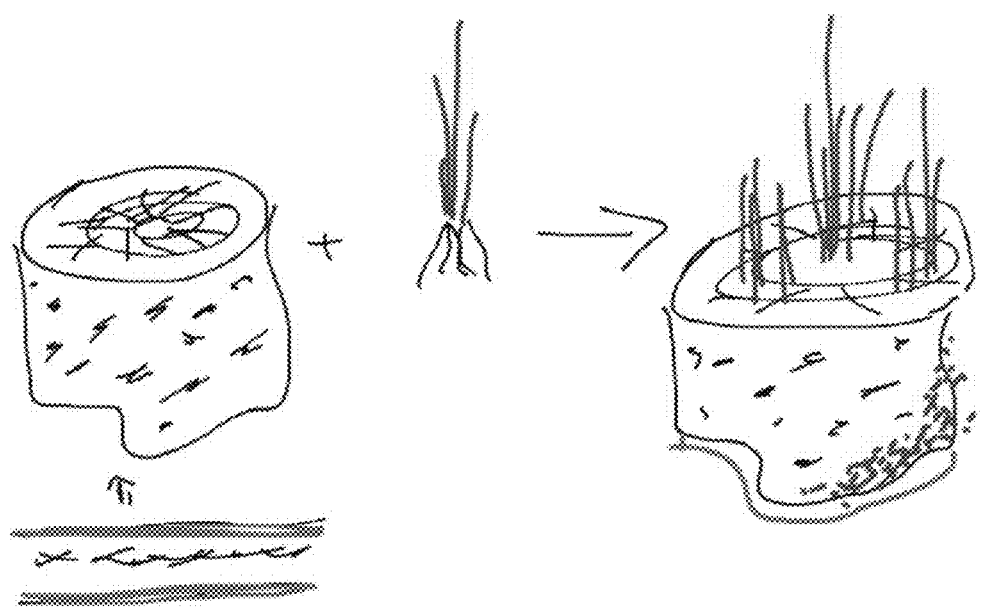
FIG. 17A is a perspective view of Stumpies embodiments of the present invention.
Figure 17B:
FIG. 17B are photographs showing Stumpies embodiments of the present invention.

FIGS. 17A-17B show Stumpies, which are tree stumps modified to serve as planters. Providing years of enjoyment rather than just a quick burning fire, plant Stumpies immediately or let them slowly rot from the top to watch ecology in action. As Stumpie rots, add a bit of soil and plant grasses, annuals or other perennials. Bottoms are preferably sealed with 3-4 layers of durable fabric and metal mesh to hold in soil and the base and bark together as the stump ages. Each Stumpie is as unique as the tree it came from. Exterior can be treated with weather resistant sealant (optional).

Figure 18A:
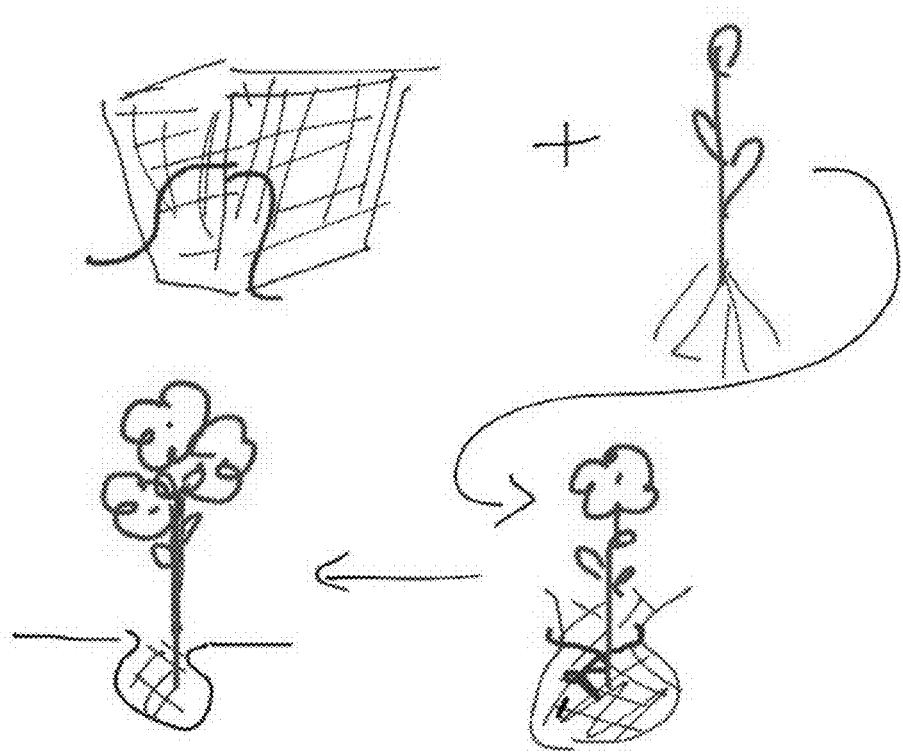
FIG. 18A is a side and perspective view of Sacs embodiments of the present invention.
Figure 18B:
FIGS. 18B-18C are photographs showing Sacs embodiments of the present invention.
Figure 18C:
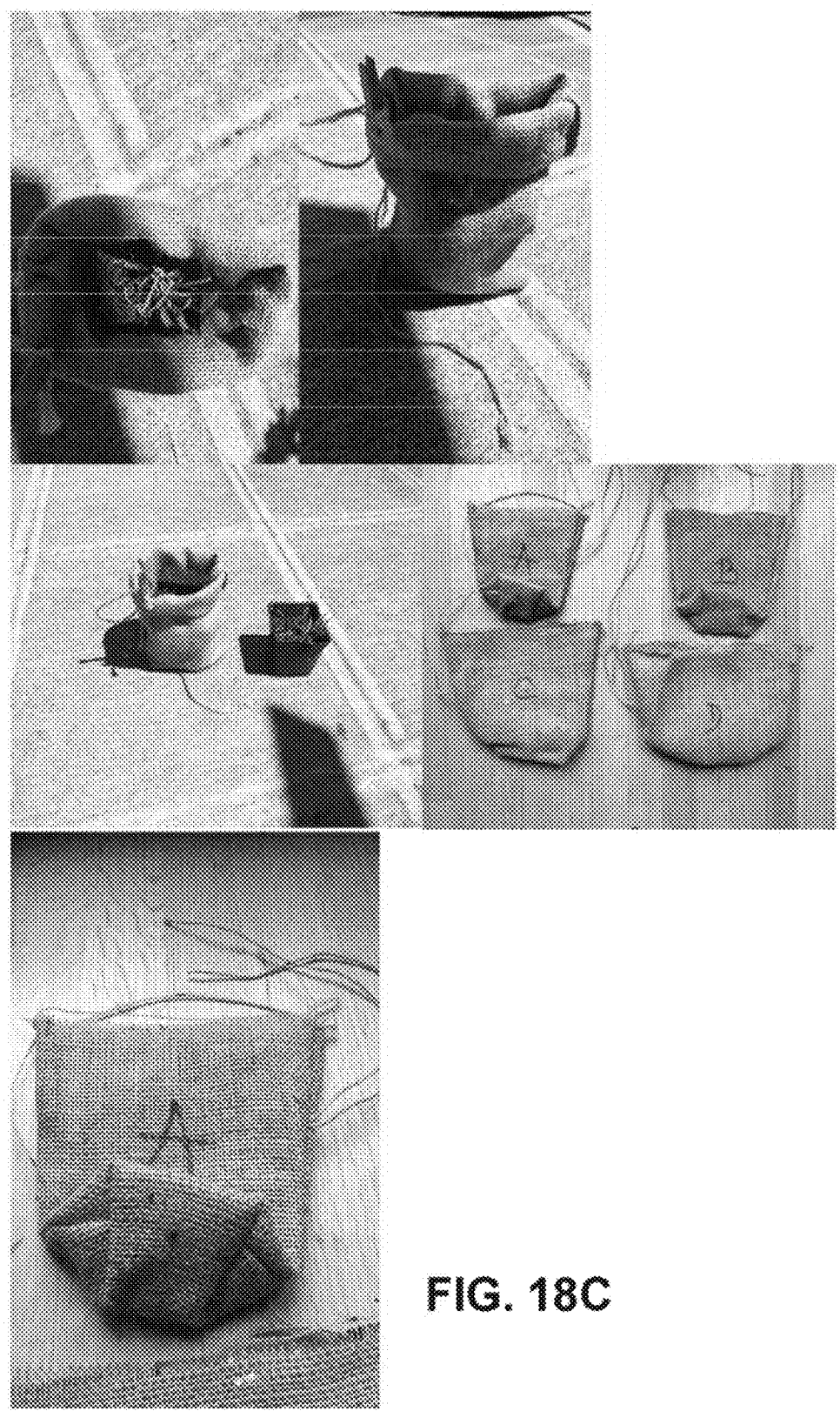

FIGS. 18A-18C show Sacs, which are made of burlap, or other natural, sustainable fabric that is plant friendly and biodegradable, allowing plants to root right through them. Plastic pots create massive recycling problems for our cities and our environment. They are unsightly buried in the ground and environmentally expensive for our planet. They do not allow root systems to breathe, an unnatural situation for roots of any plant. The hard, unbreathable barrier of a plastic pot promotes drowning due to water retention and death due to being pot-bound (roots grow in circles inside a pot). Plastic pots waste expensive soil for growing or transporting plants with shallow root systems that require little soil. This adds to the weight and therefore to the cost of transportation. Plastic pots can crack easily when cold or during transport. They prevent water uptake from 3 of the 4 sides and so waste all water not directly applied the small surface area at the top of the pot. They waste space laterally both during growing and transport of plants. Because different manufacturers all use differently shaped pots, plastic pots do not stack easily when they come from different sources. This lack of a standardized plastic pot creates storage and sorting issues all the way along the supply chain as well as to the grower, installer, and end-user.

Sacs are made of burlap, or other natural, sustainable fabric that is plant friendly and biodegradable. Plants root right through them. The sacs can be placed directly in the ground where the sac will decompose or they can be reused for another plant. A box bottom construction of any shape or form (T-shaped or round or oval or triangular bottoms) with durable seams (surge or flat felled seams) allows just the right amount of soil for any plant. For heavier plants with a larger root ball or plants requiring a longer growing period, additional layers can be added (of burlap, other fabrics or meshes of metal or plastic) or a liner can be inserted or sewn in. Upper portions are flared for easy filling and planting. Upper portion can be folded down to adjust the height or folded in over the top of the soil surface to keep out weeds and retain water. A string or other closure also keeps weeds out of the top surface of the plant yet allows watering from all sides. The sacs double as gift bags and can be marked, tagged or silkscreened with any company logo or plant id tag. They can be produced in a variety of sizes and decorated for marketing and sales needs.

Figure 19A:
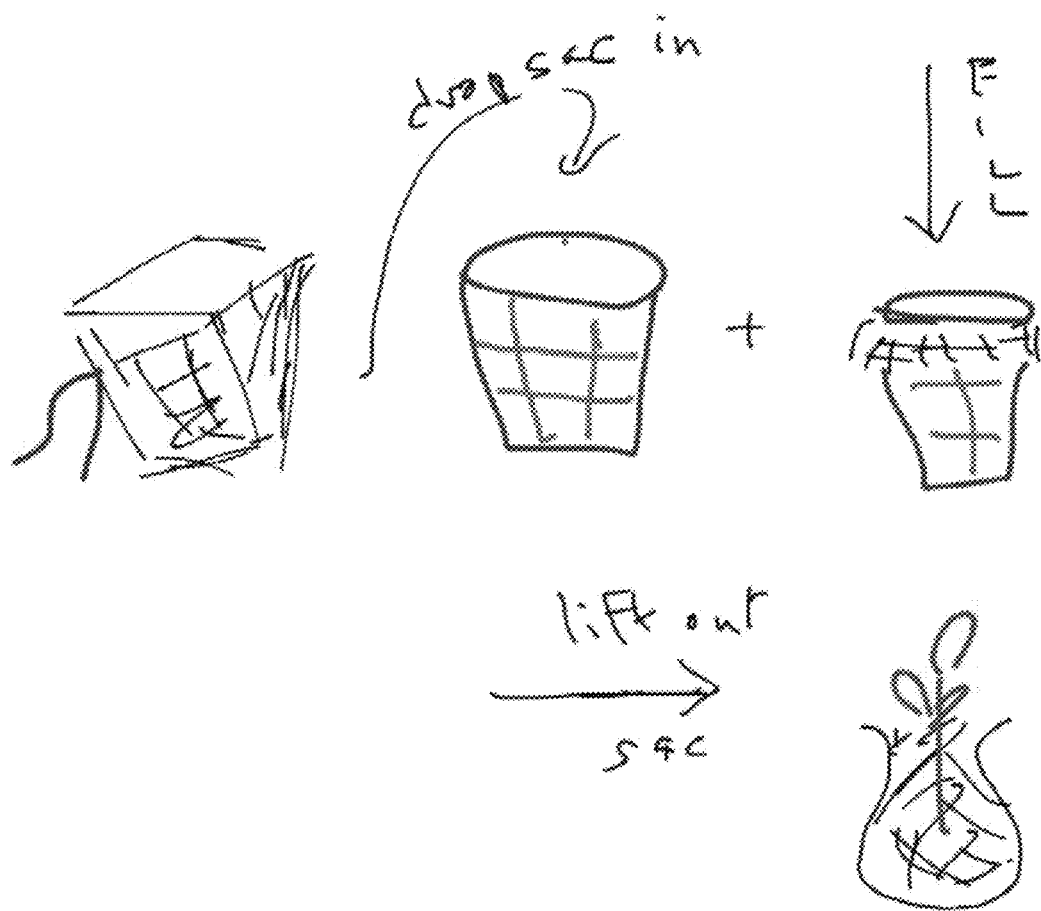
FIG. 19A is a side and perspective view of Growables embodiments of the present invention.
Figure 19B:
FIG. 19B are photographs showing Growables embodiments of the present invention.
Figure 20:
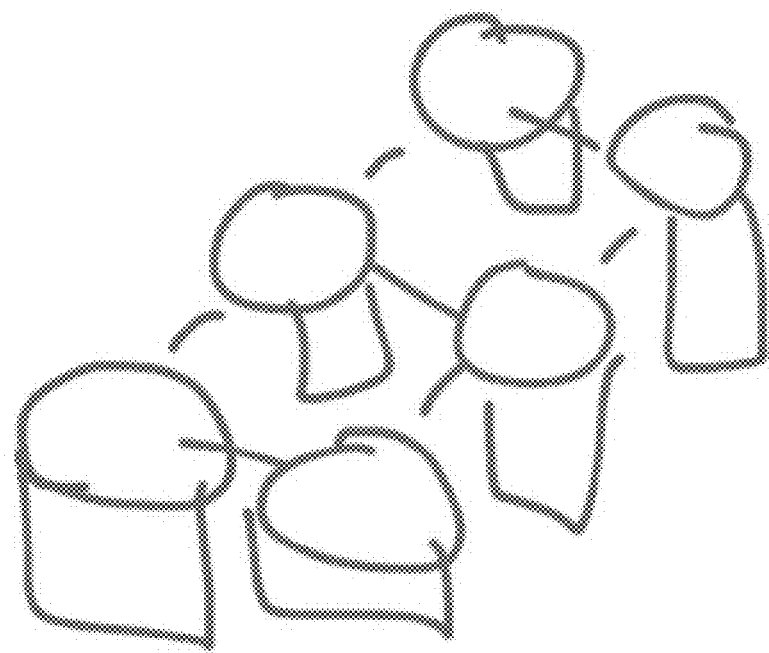
FIG. 20 is a perspective view of a Portables embodiment of the present invention.

FIGS. 19A-19B show a variation of Sacs called Growables. Used in conjunction with Sacs, these plastic (or metal, bamboo or other reusable or renewable material) cages provide the stability and durability of a pot made from conventional materials (terra cotta, bamboo or plastic) at a fraction of the weight, cost and volume. Made for the growth and transportation of single plants and use as a hard structure to aid in filling and planting a Sac. Insert a sac into a Growable and roll the top of the sac down over the upper edge of the Growable or flop the upper edge of the sac inward around the plant itself FIG. 20 shows a variation of Growables called Portables: These are multi-pocket 6-12 packs or more of Growables ganged together for annuals or seedlings or transportation of 4" or 6" equivalents. They can be clipped together or fused as a unit as needed for various uses and sizes of plant. Add Sacs, fill with soil, plant, water, grow, transport, sell and repeat.

Figure 21A:
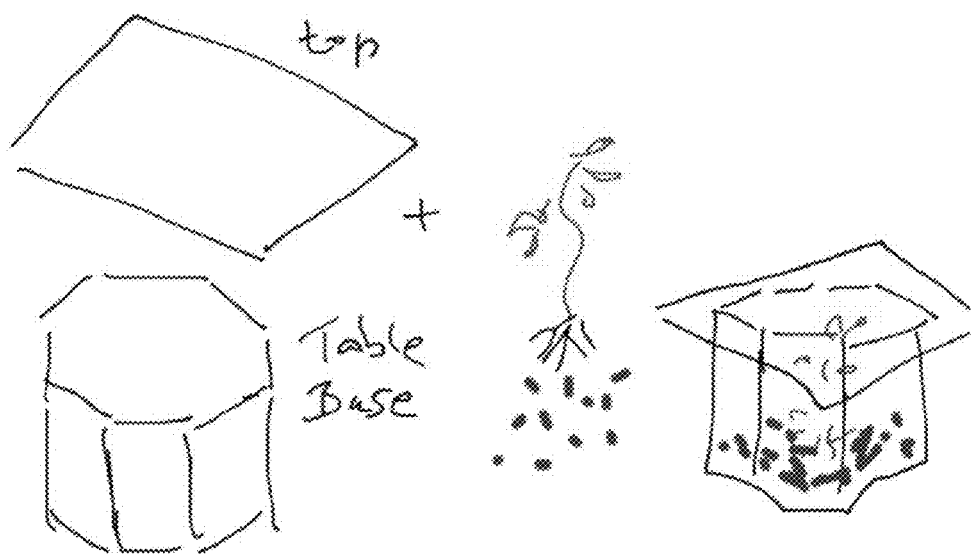
FIG. 21A is a perspective view of Terrarium Tables embodiments of the present invention.
Figure 21B:
FIG. 21B are photographs showing Seed Hutch embodiments of the present invention.
Figure 22A:
FIG. 22A are perspective views of Seed Hutch embodiments of the present invention.
Figure 22B:
FIGS. 22B-22D are photographs showing Terrarium Tables embodiments of the present invention.
Figure 22C:
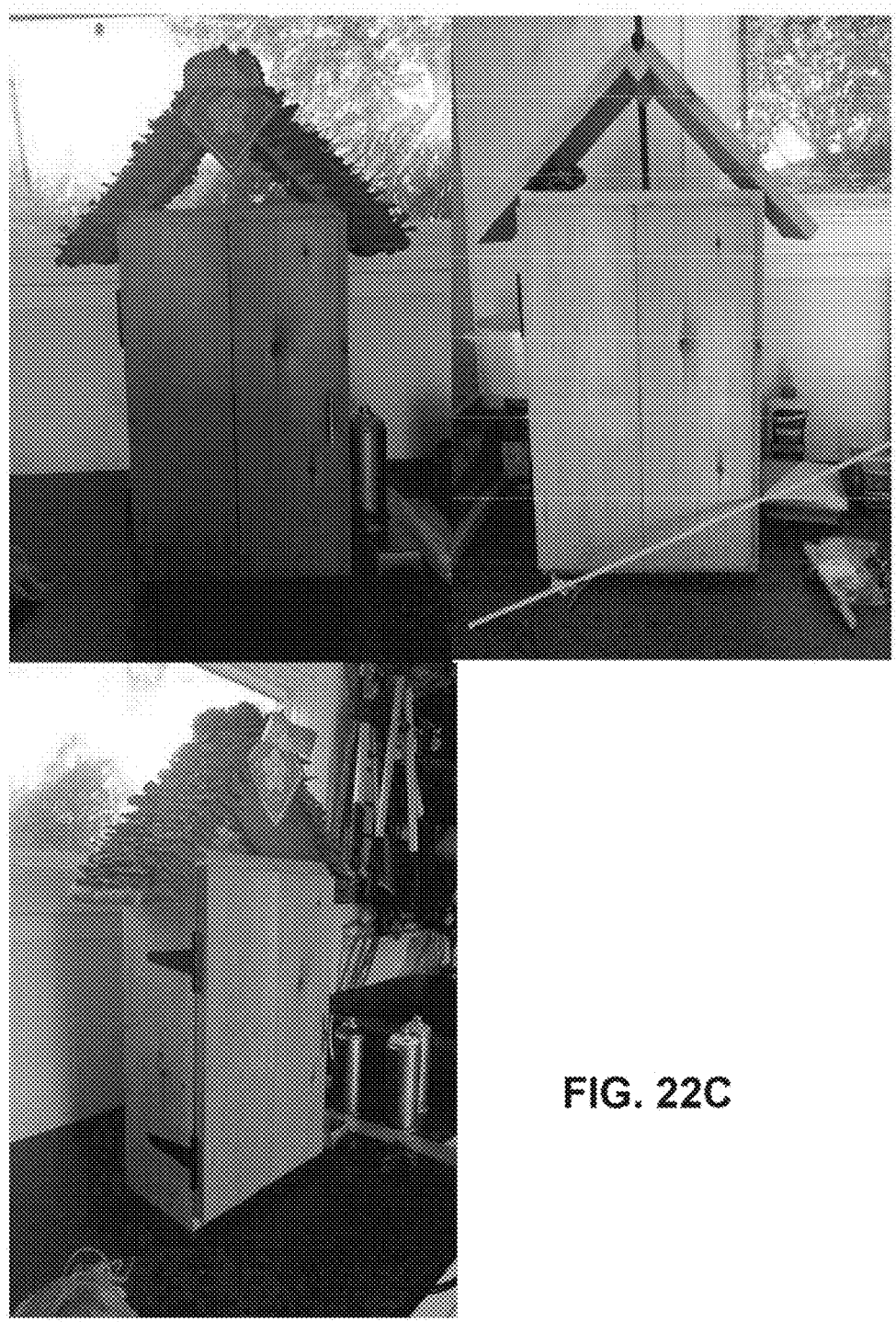
Figure 22D:

FIGS. 21A-21B show Terrarium Tables, self-contained terrarium coffee tables that sustains their own ecology. Requires opening for maintenance (e.g., watering, glass cleaning, pruning) every 1-2 years. In a preferred embodiment, half-inch glass top, bottom and sides joined with aquarium glue. Base of any size (width and height) and shape (square, rectangular, round, triangular, etc.) is edged in powder-coated aluminum in a wide range of colors. Tops made to match the shape of the base or contrast with it. Two or three of the glass sides are notched to allow airflow and these notches are covered with a clear mesh (optional) when animals such as tree frogs or reptiles are desired. Live food for animals can be slipped through these notches. Pools and logs and vegetation including dwarf trees do well inside our terraria.

Growing Circles

FIGS. 22A-22D show Seed Hutch, which are creatively designed seed storage areas. Stock it with a few seed envelopes (order envelopes here; you provide the seeds), desiccant to keep them dry and viable, It's Got Pot-ential cards to label each species or item, and clothespins to hold the cards on the shareable item and let the sharing begin. Preferably, a solid wood, weather-resistant post supports both the Seed Hutch and the Information Box.

FIGS. 23A-23D shows a Tree, which is a support for vertical display and growth of plants, flowers, herbs, etc. while allowing for easy viewing, pruning, snipping/sharing with others, etc. Pick a sunny spot on your street and watch delighted neighbors come to snip fresh herbs for cooking from the Tree. A pleasing and practical vertical design with a small footprint, it comes with scissors for snipping and a gentle bell to ring for each mini-harvest. The Belltower and scissors are attached with a "rainbow chain" so neighbors can ring once when they snip and then remember to leave the scissors for the next person. Rebar stake or other metal pipe driven through large heavy lower pot supports 4 light-weight upper pots. Choose from wire baskets with coco mat or plastic pots. Terra cotta and other heavy materials not recommended for the upper pots.

Figure 23A:
FIG. 23A is a perspective view of a Tree embodiment of the present invention.
Figure 23B:
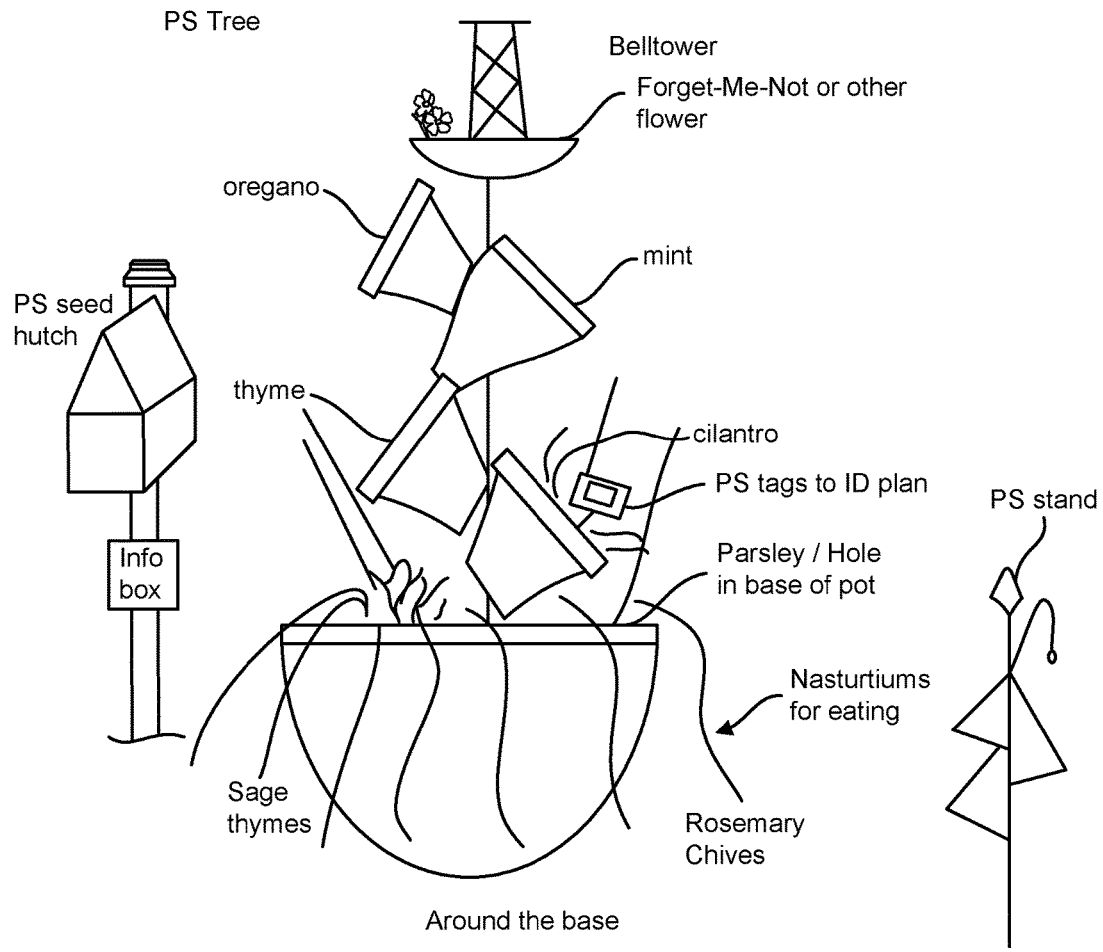
FIG. 23B is a perspective view of a PlantShare Circle embodiment of the present invention.
Figure 23C:
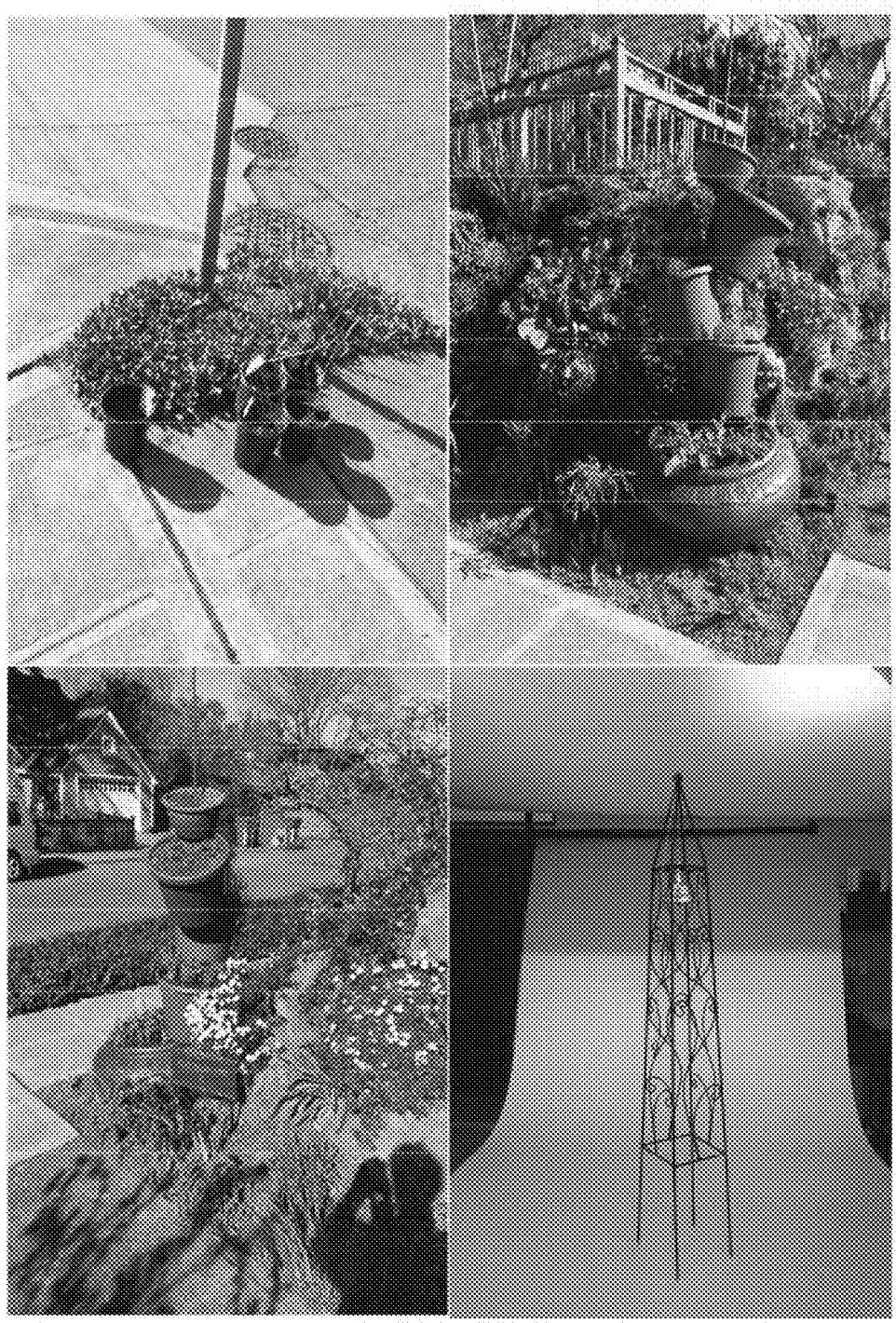
FIGS. 23C-23D are photographs showing Trees and Circles embodiments of the present invention.
Figure 23D:
Figure 23E:
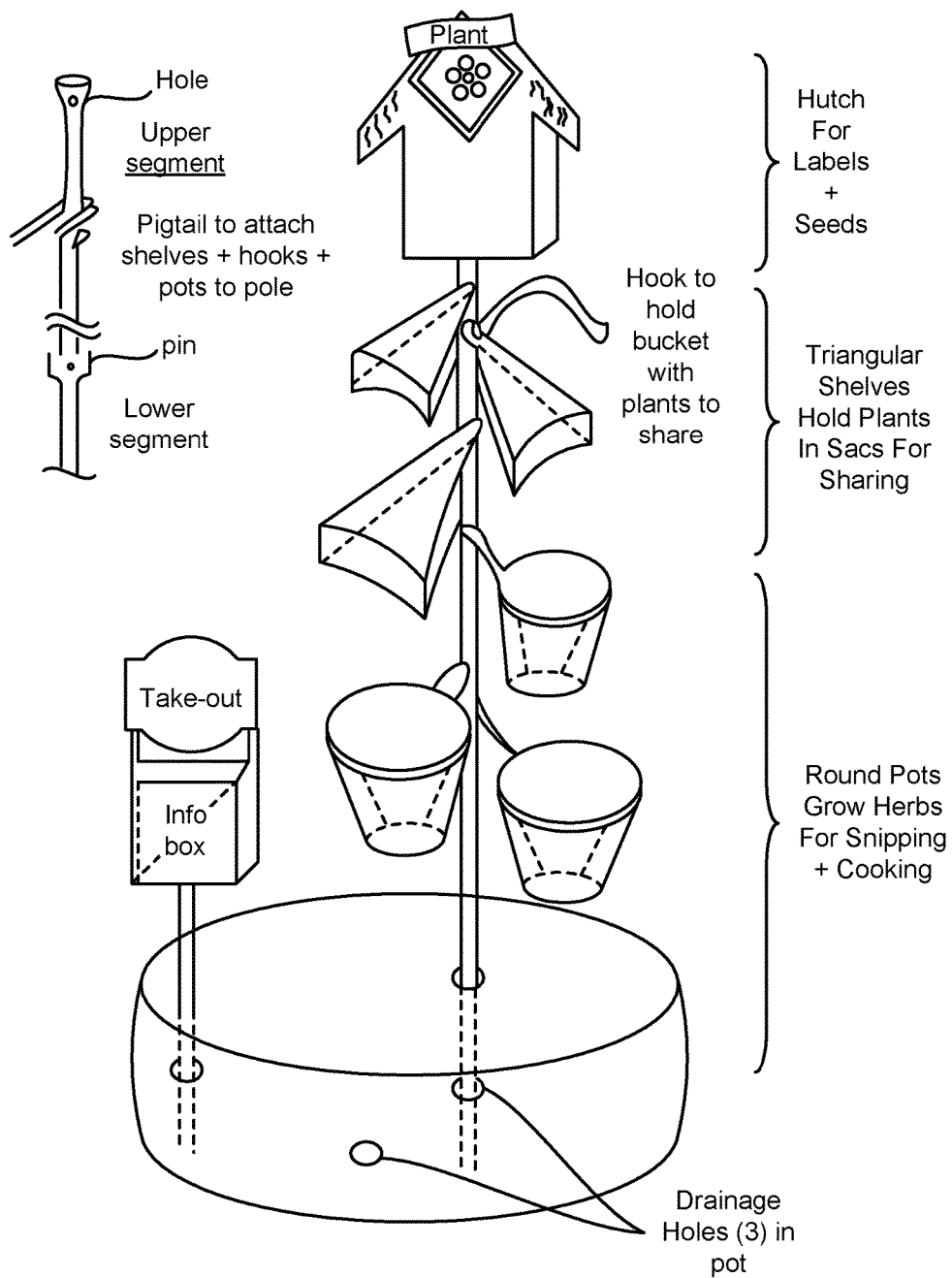
FIG. 23E is a front view showing a particular application of the Tree and Stand as part of a PlantShare Circle.

FIGS. 23B and 23E show a particular application of the Tree and Stand (described below) as part of a PlantShare Circle. The Circle combines elements of the Tree and Stand with others features such as the Seed Hutch. The fully integrated PlantShare Circle is the PlantShare Give & Take Out Garden, which combines the Tree, Stand and Seed Hutch into a modular unit. In this configuration, the Hutch, shelves, pots and hooks ("items") are attached to a central pole by a pigtail that allows each item to be swiveled, moved vertically or removed as needed, e.g., as weather conditions or plant availability dictate. The Tree portion—including the round pots—may be planted with herbs or other edible plants that can be snipped as needed by neighbors. The Stand portion—including the triangular shelves—are intended to be filled with plants, for example in Sacs, for sharing. The hook, which also may be on a pigtail, is intended to hold a bucket for plants not in Sacs, cut flowers or edibles such as herbs, or any other garden materials for sharing, e.g., soil or stakes. The central pole and the pole for the Info Box preferably pass through the drainage holes in the bottom pot. All of the pots in this structure can be of any shape or size. The two poles are segmented to allow for easy expansion or contraction and removal at will (e.g., for inclement weather).

With particular reference to FIG. 23E, in one preferred embodiment the PlantShare Circle includes a base or pot with drainage holes; an integrated Stand, with round pots to grow herbs for snipping and cooking; an integrated Tree, with triangular shelves to hold plants for sharing; an integrated hook to hold a bucket with plants to share; an integrated Seed Hutch for seeds and labels; and an integrated pigtail to attach shelves, hooks or pots to the pole, which may consist of upper and lower segments. The Circle may also include an Info Box. The various components may be combined in different combinations, using only certain elements, to fit a particular application.

Figure 24A:
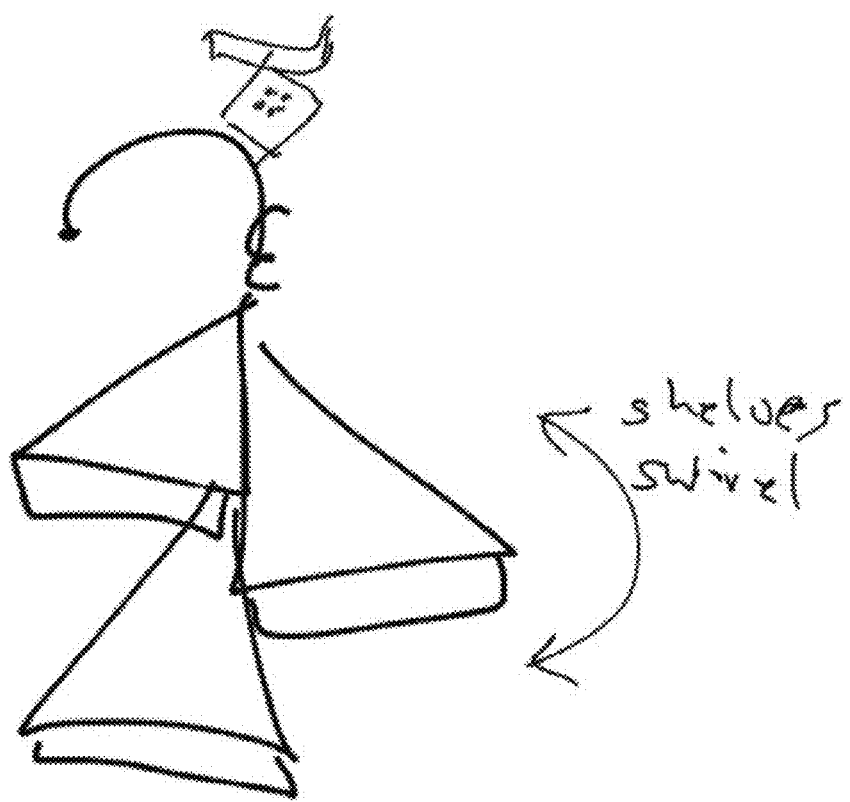
FIG. 24A is a perspective view of a Stand embodiment of the present invention.
Figure 24B:
FIGS. 24B-24C are photographs showing Stand embodiments of the present invention.
Figure 24C:

FIGS. 24A-24C show a Stand, preferably made out of powder coated tubing, it comes in one embodiment with three adjustable shelves and hooks. A hand-bell with signage tops the Stand for neighbors to ring when they share (one ring signals taking, two rings signals giving). Bury the round base and lay flagstones on top for stability or attach to the street sign post along your sidewalk (permission of the local municipality required). The shelves rotate easily and are fully height adjustable. Optional umbrella or screen (on its own hook) shades transplants.

Water

FIGS. 25A-26C show Pot Rocks, a system for displaying, arranging and growing plants in a water feature. Upper portion hides the top of the pot with mix-and-match faux rocks. The underside of each real or faux rock (ceramic, plastic or other synthetic material) is a grooved clipping system that accommodates pots of various shapes and sizes. The rocks, pot, box and base (preferably made of polymer or other water resistant material) together serves five purposes: weights pot and plant so they do not float or tip over; and allows the height of the plant to be adjusted for the proper growing conditions; and allows the height of the overall depth of the pot and plant; allows the plant to be leveled, allow the plant to be moved easily.

Preferably the base clips onto any size/shape pot and will not rust or discolor pond or water. The preferably includes grooves to fix round and square pots, and comes in multiple shapes, sizes and surfaces.

Figure 25A:
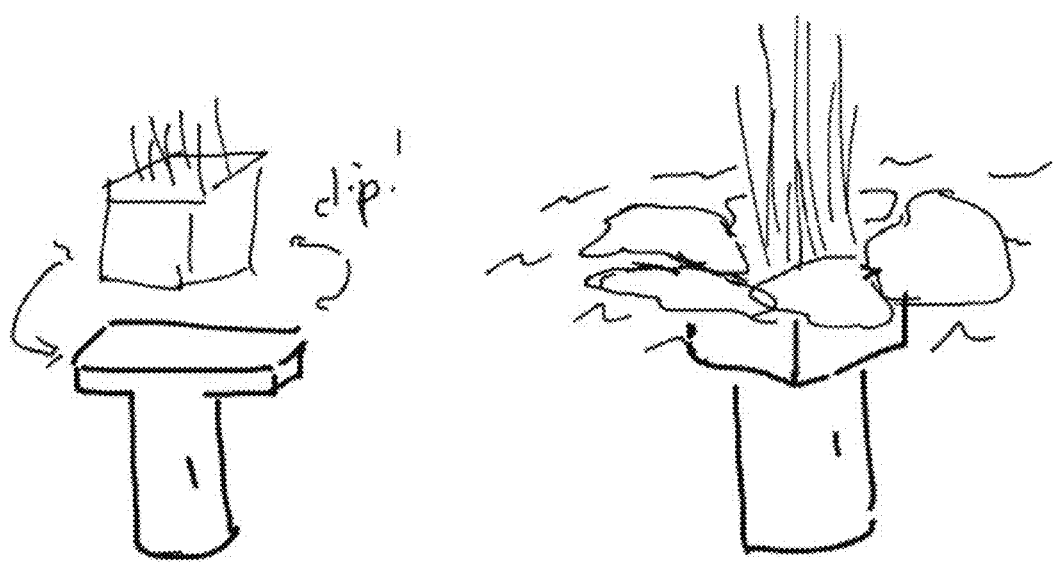
FIGS. 25A-25C are perspective views of Pot Rocks embodiments of the present invention.
Figure 25B:
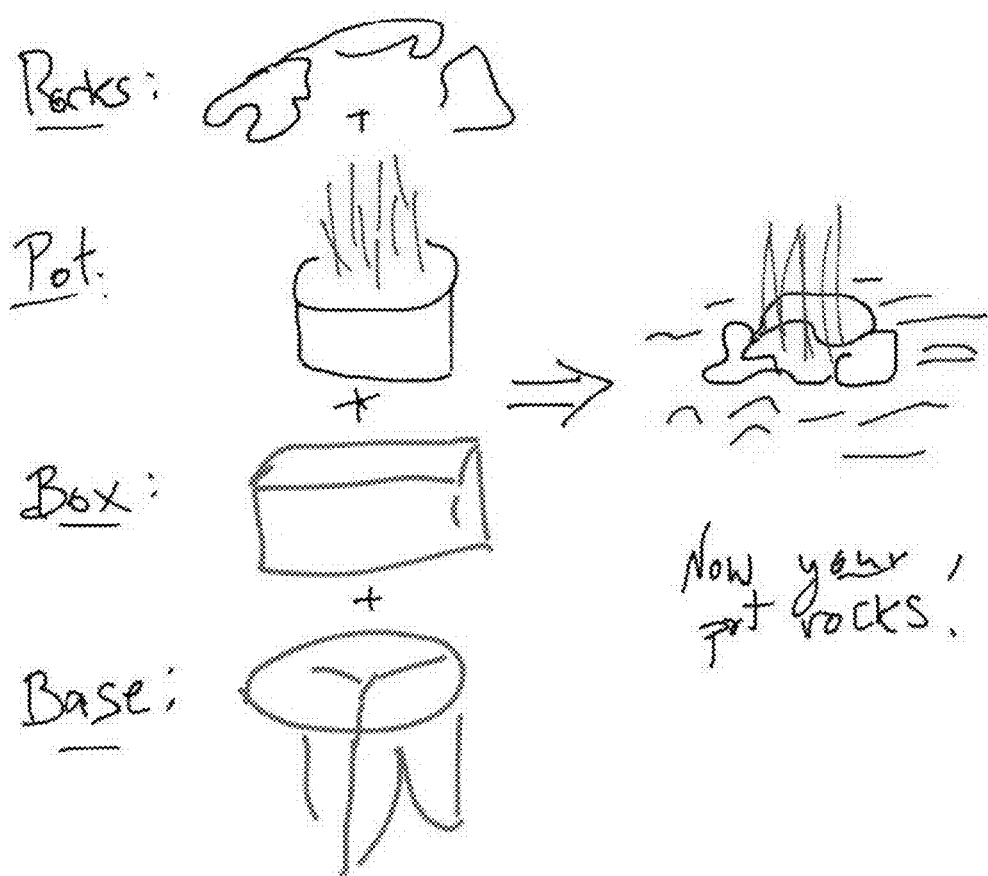
Figure 25C:
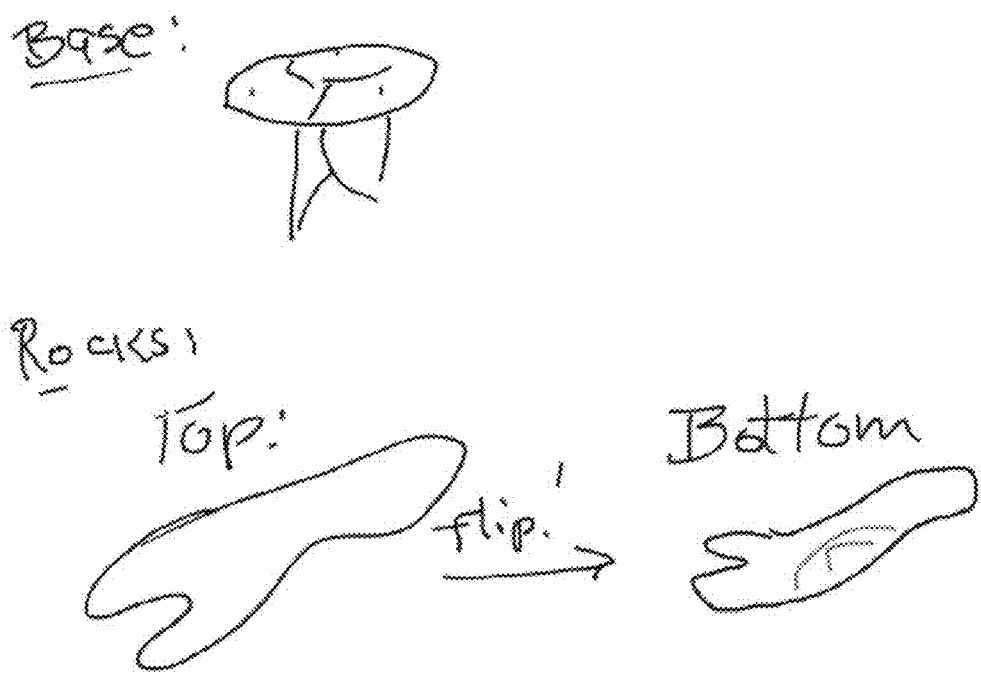
Figure 26A:
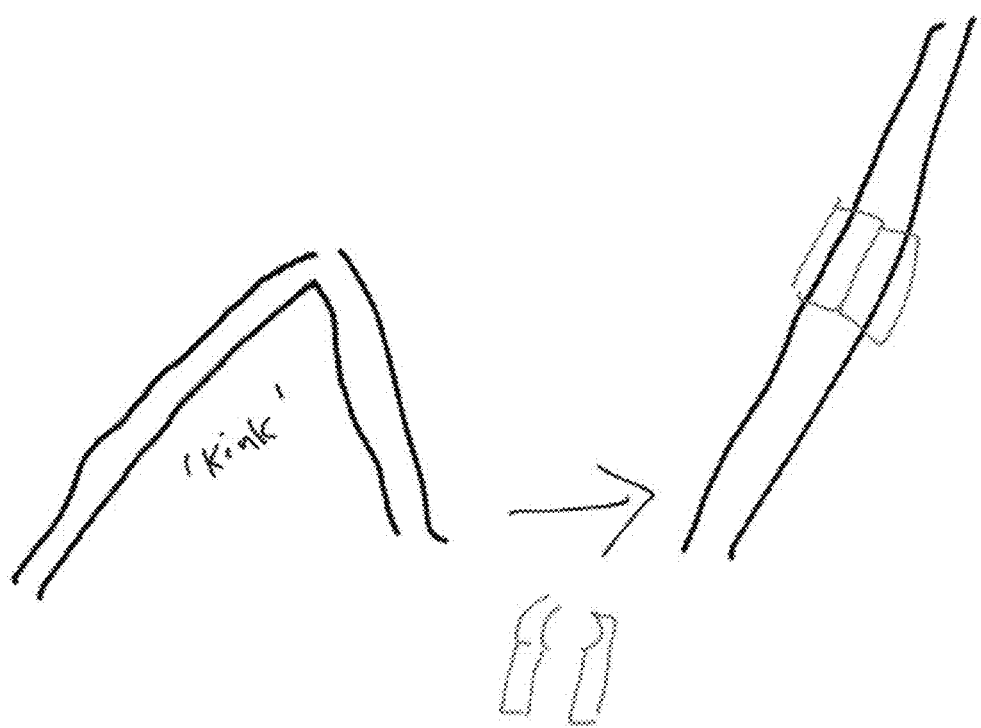
FIGS. 26A-26C are perspective and side views of Hose Helpers embodiments of the present invention.
Figure 26B:
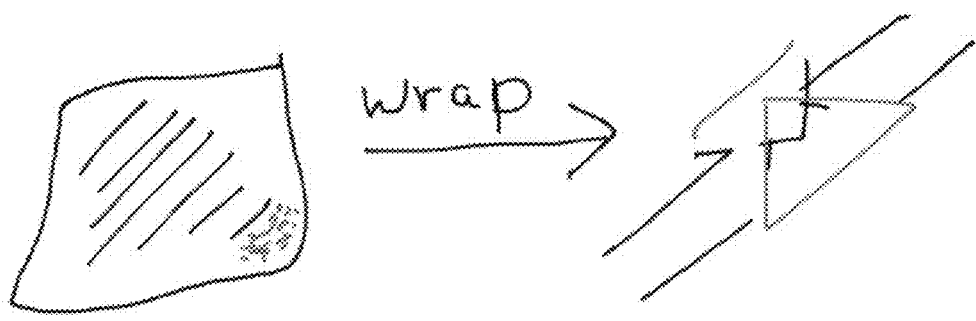
Figure 26C:
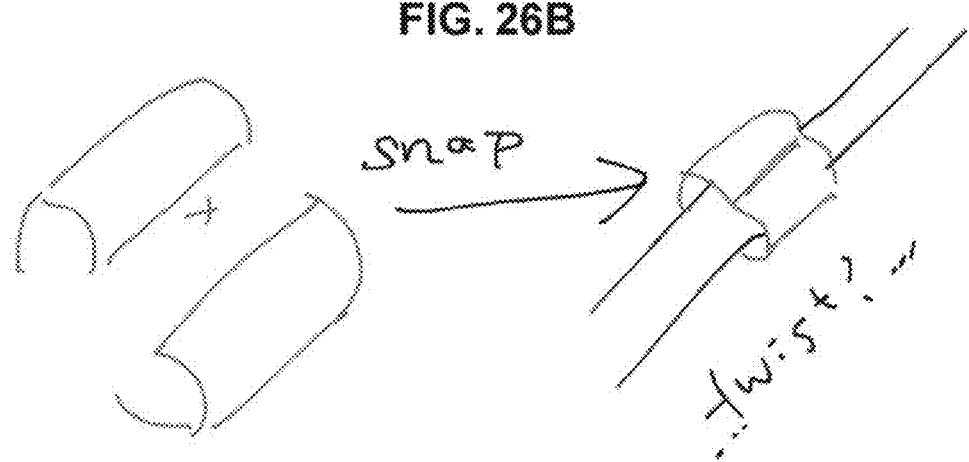

FIGS. 26A-25C show Hose Helpers, a two-part clip made out of sturdy material (e.g., bamboo, metal, plastic, nylon, fabric or combination thereof) that prevents a weakened spot in a hose from re-kinking at the same place or a soaker hose from overwatering at an overlarge or damaged hole. Extends the life and utility of any style of hose (conventional, coil or soaker). Modeled after clips for restaurant shelving, these are study, lightweight and easy to store, ship and modular. Kit for soaker hose repair comes with glue to help seal the holes in that section and hold the clip in place.

Figure 27:
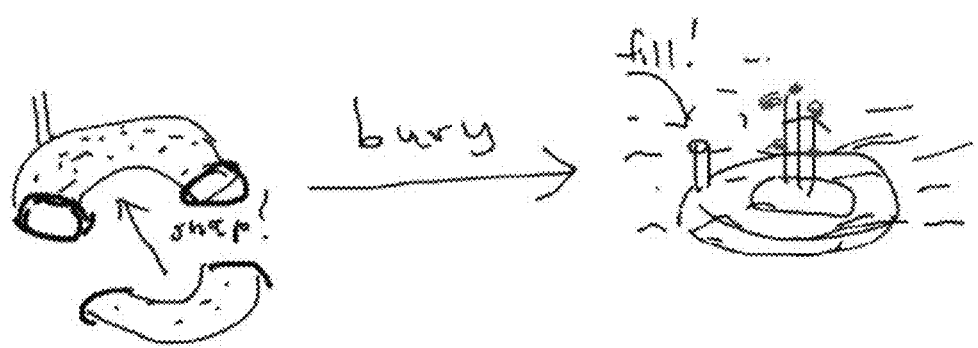
FIG. 27 are perspective views of Watering Moats embodiments of the present invention.

FIG. 27 shows Watering Moats, which are modular, porous moats that slowly deliver water to plants during delicate phase of establishment post transplantation. Arrange and then bury these around the base of a tree, shrub or perennial while planting and leave in place until the plant is established, or alternatively keep above ground. A filling port for is the only visible portion above ground. Conserves water by delivering water directly to the underground root system and avoiding run-off and evaporation from the soil surface. Avoids above ground unsightly watering towers or tents now in use. Preferably made using perforated pipe to slowly deliver water at roots. May be modular; add wedges to increase the diameter and flow as needed. May be permanent and removable or biodegradable and can be left in place to rot when no longer needed. May be straight or curved. Preferably uses an easy snap configuration. Can be filled with gel system to further adjust delivery rate of water to the plant.

Figure 28:
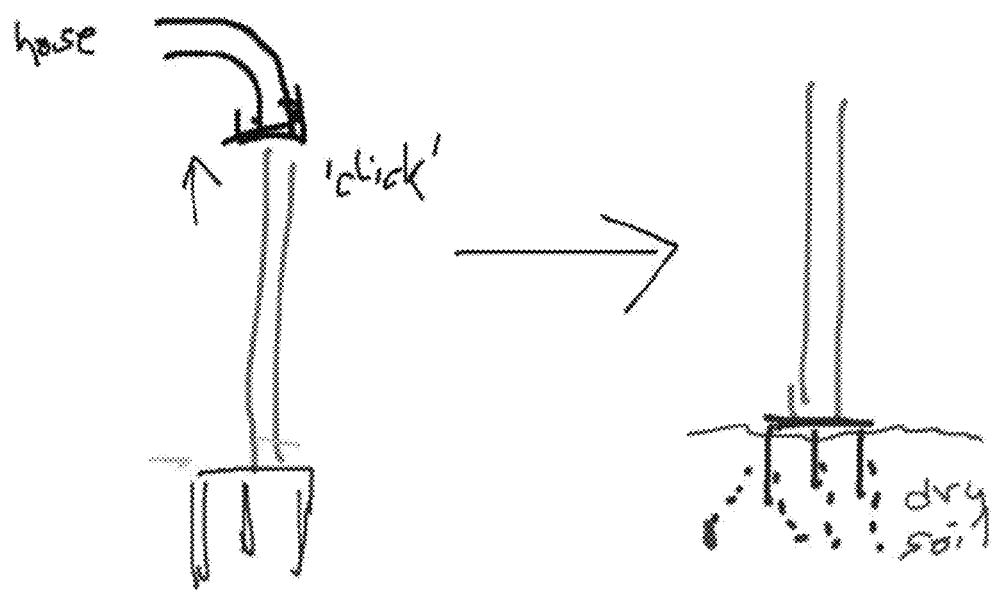
FIG. 28 are side views of Injection Watering embodiments of the present invention.

FIG. 28 shows Injection Watering, a unique irrigation system designed for planting, deep watering, dry soil, rock walls, and root feeding for shrubs and trees. Consists of four parts: shaft, handle, regulator and head. Quick release fittings attach your hose to a solid shaft (3", 6", 12", 24" or 36") long suitable for inserting the head into a rock wall or standing while inserting watering head into the ground. Extensions (sold separately) that allow user to adjust for different standing heights, or other vertical or horizontal or angled applications. Shaft is topped with a 6" length of flexible hosing to ease the angle of the hose where it meets the shaft. Heads come with 1, 2, 3 or more prong heads each with perforated water delivery system. Depth indicator, pressure regulator, timer, set water volume and pulse delivery are optional features depending on model and make.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:
1. A modular display system, comprising:
   a seed storage hutch;
   a vertical display stand supporting the seed storage hutch;
   at least one pigtail attached to the stand and configured to support at least one growing pot, hook or shelf above the ground, wherein the at least one pigtail is attached to the stand and may be swiveled, positioned vertically along the stand or removed entirely; and
   a base configured to receive and support the display stand in a substantially vertical orientation.

2. The system of claim 1, wherein the base comprises a lower growing pot having at least one drainage hole.

3. The system of claim 2, wherein the stand may pass through the at least one drainage hole.

4. The system of claim 2, further comprising a plurality of stands configured to support at least one of a seed storage hutch or at least one pigtail.

5. The system of claim 1, wherein the stand passes through at least one drainage hole in the base to secure the stand into the ground.

6. The system of claim 1, wherein the stand is made from rebar.

7. The system of claim 1, wherein the stand is made from weather-treated wood.

* * * * *